United States Patent [19]

Jonsson

[11] Patent Number: 5,539,813
[45] Date of Patent: Jul. 23, 1996

[54] METHOD AND A SYSTEM FOR FINDING A TIME AND A PLACE FOR TWO OR MORE USERS TO COMMUNICATE IN THE FORM OF A MEETING

[75] Inventor: Björn E. R. Jonsson, Järfälla, Sweden

[73] Assignee: Telefonaktiebolaget LM Ericsson, Stockholm, Sweden

[21] Appl. No.: 18,223

[22] Filed: Feb. 16, 1993

[30] Foreign Application Priority Data

Feb. 17, 1992 [SE] Sweden .................................. 9200468

[51] Int. Cl.$^6$ ............................................ H04M 3/42
[52] U.S. Cl. ..................... 379/202; 379/203; 379/204; 379/107; 379/209
[58] Field of Search .................................. 379/201, 202, 379/203, 204, 205, 206, 207, 209

[56] References Cited

U.S. PATENT DOCUMENTS

| | | | |
|---|---|---|---|
| 4,172,969 | 10/1979 | Levine et al. .................... | 379/97 X |
| 4,763,191 | 8/1988 | Gordon et al. .................... | 379/201 X |
| 4,796,293 | 1/1989 | Blinken et al. .................... | 379/202 |
| 4,899,375 | 2/1990 | Bauer et al. ...................... | 379/264 |
| 4,910,766 | 3/1990 | Ogino et al. ...................... | 379/201 |
| 4,933,966 | 6/1990 | Hird et al. ........................ | 379/132 |

FOREIGN PATENT DOCUMENTS

| | | |
|---|---|---|
| 0140351 | 5/1985 | European Pat. Off. . |
| 0435449 | 7/1991 | European Pat. Off. . |
| WO89/10044 | 10/1989 | WIPO . |
| WO92/01350 | 1/1992 | WIPO . |

*Primary Examiner*—Jeffery Hofsass
*Assistant Examiner*—Harry S. Hong
*Attorney, Agent, or Firm*—Burns, Doane, Swecker & Mathis

[57] ABSTRACT

A method and a system for establishing communication between two users over at least one telecommunication network. Communication is established in the form of a meeting between the users. The users cooperate in the establishment of the meeting by the first user A sending a meeting request to an intermediary, called a meeting broker, which negotiates with the users in order to establish the conditions under which the proposed meeting shall take place. A connection between the users A and B is not established on the initiative of the meeting broker until both users A and B are in agreement with the conditions.

22 Claims, 15 Drawing Sheets

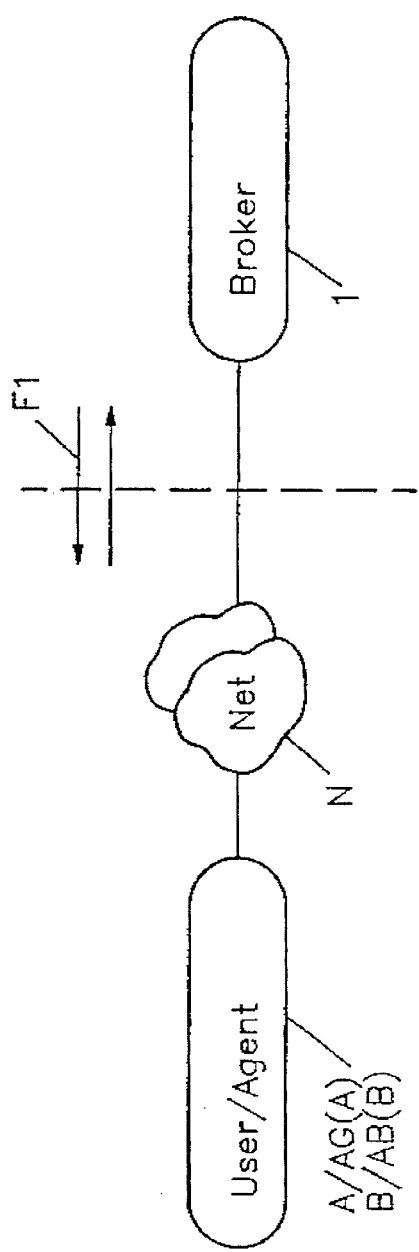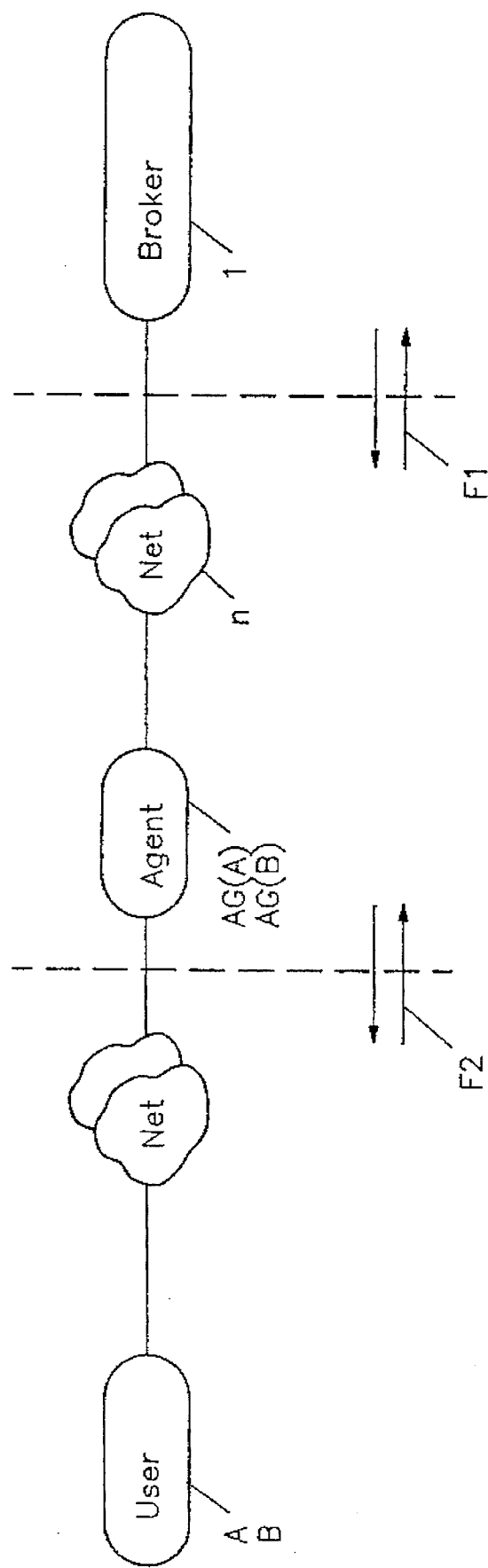
Fig 1

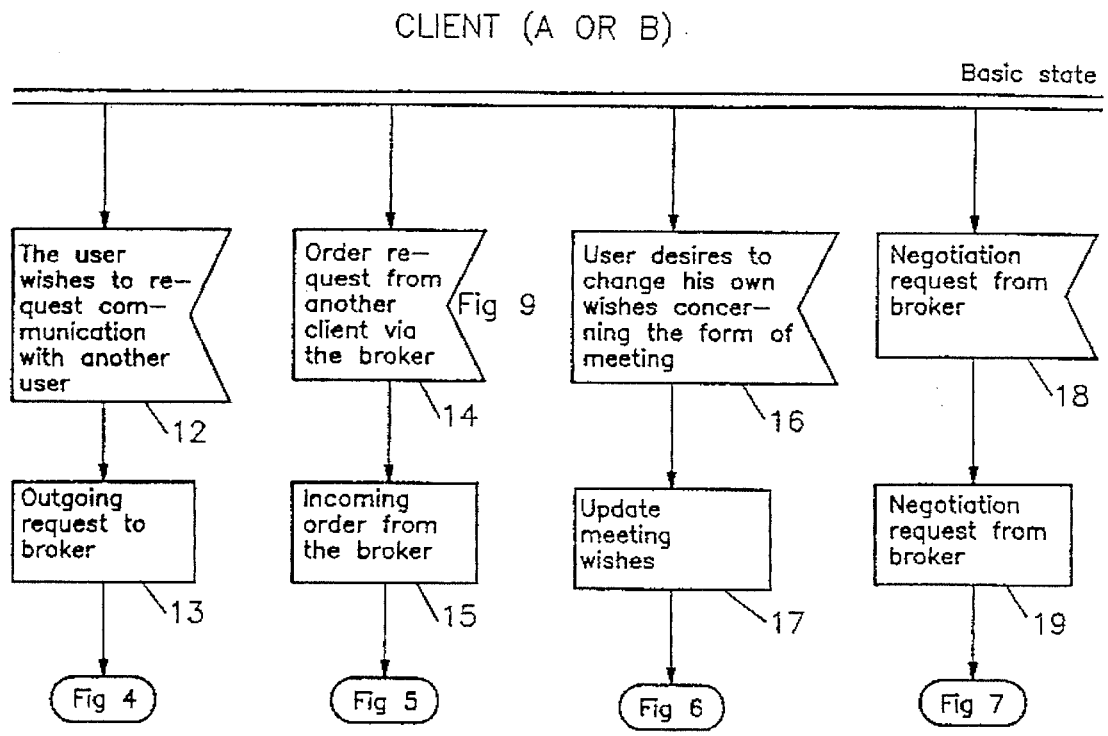
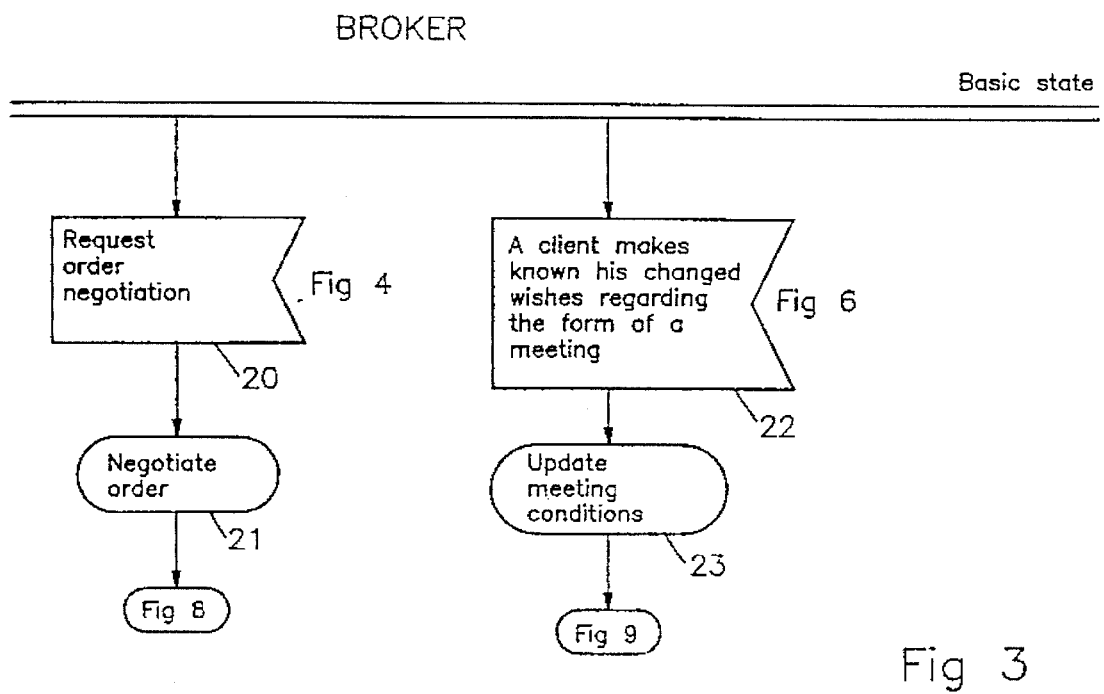
Fig 3

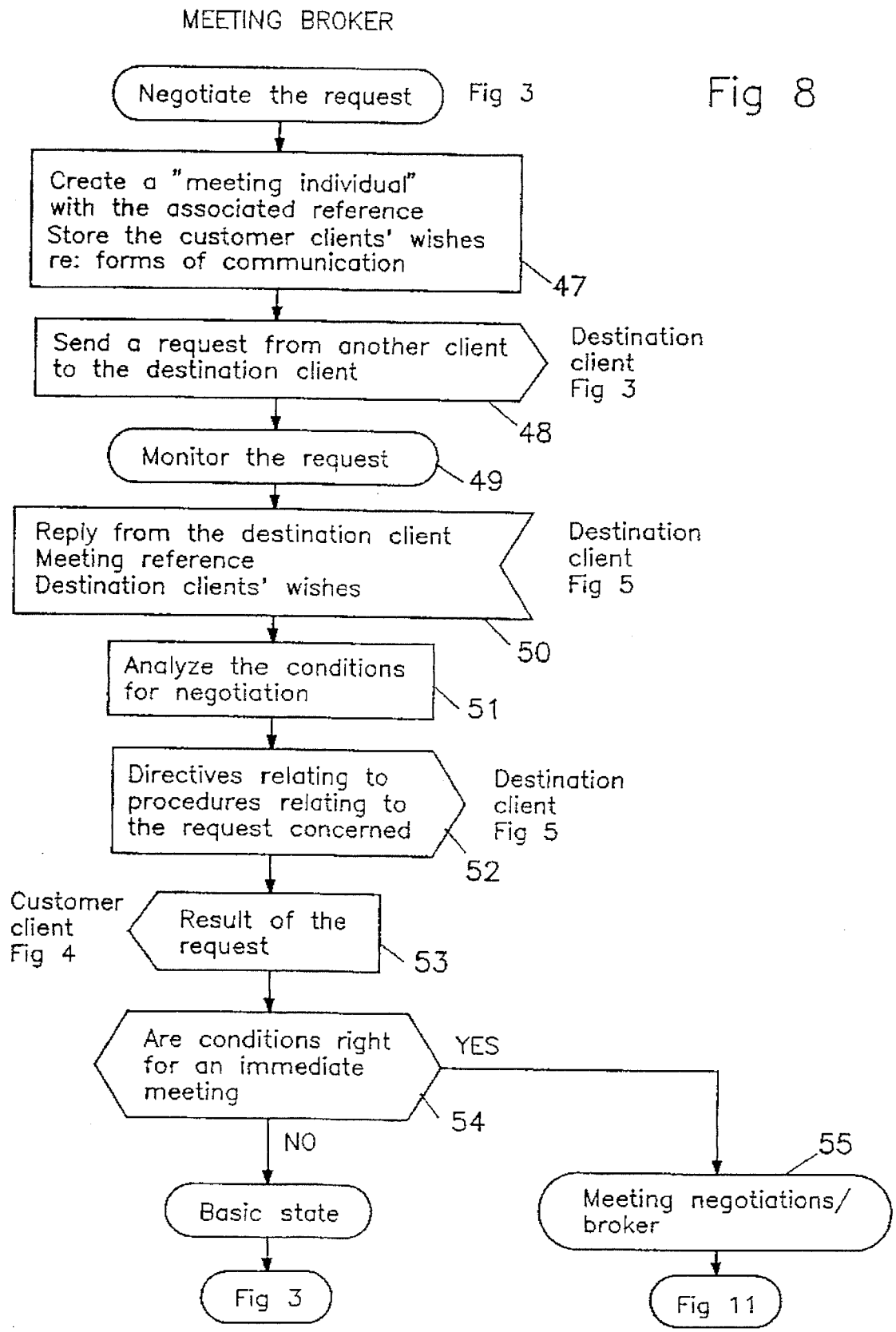

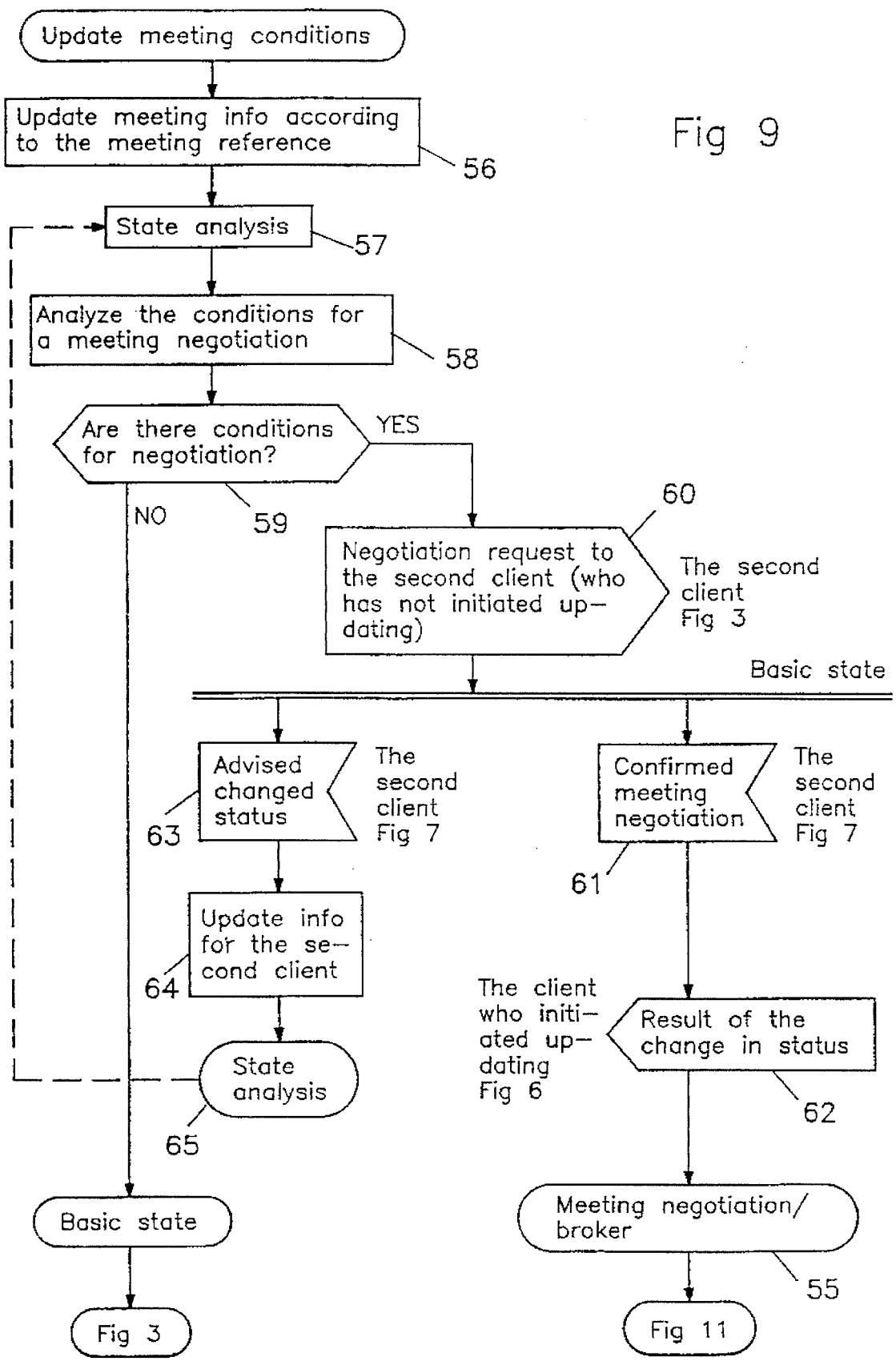

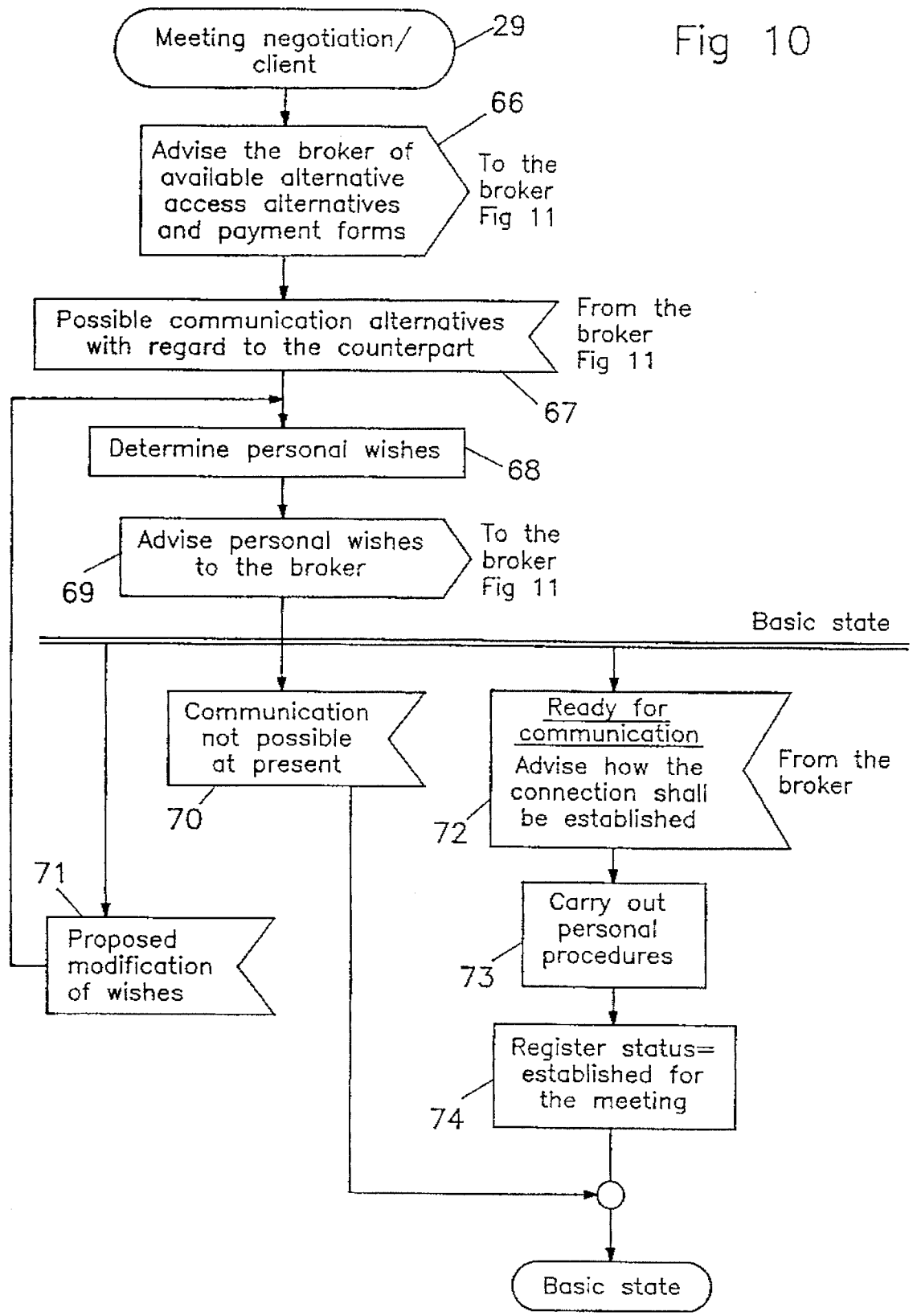

Fig 12

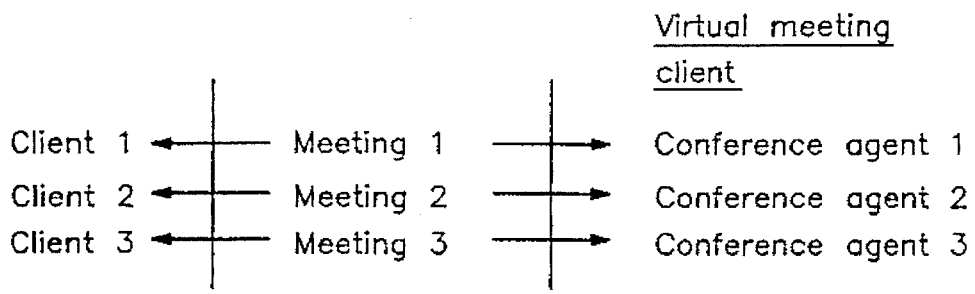

Fig 13

| MEETING ID (MID) | SENDER | STATUS | TYPE | TIME |
|---|---|---|---|---|
| 10 11 12 | Karl Persson | OK | DIR | SEN |
| 10 11 13 | Olle Andersson | NO | | |
| 10 11 14 | Per Nilsson | OK | IND | SEN |
| 10 11 15 | Jan Olsson | OK | DIR | NOW |
| 10 11 16 | Sture Karlsson | OK | IND | NOW |

| MEETING ID (MID) | DESTINATION | STATUS | TYPE | TIME |
|---|---|---|---|---|
| 20 11 01 | Arne Johansson | OK | DIR | NOW |
| 20 11 02 | Knut Pettersson | OK | DIR | NOW |
| 20 11 03 | August Klang | OK | IND | NOW |

91

Comments:
  STATUS OK = meeting desired
         NO = meeting rejected
  TYPE DIR = direct meeting
       IND = indirect meeting
  TIME NOW = immediate meeting desired
       SEN = meeting desired at a later time

METHOD AND A SYSTEM FOR FINDING A TIME AND A PLACE FOR TWO OR MORE USERS TO COMMUNICATE IN THE FORM OF A MEETING

TECHNICAL FIELD

The present invention relates generally to the area of communication services supplied over selected telecommunication networks.

More specifically, although not exclusively, the invention relates to a method of organizing communication between at least two users, of which a first user wishes to communicate with a second user through the medium of at least one telecommunication network.

The present invention is related to the following five Patent Applications, to which the following description refers:

(1) "A Method of Establishing an Intelligent Network Service", U.S. patent application Ser. No. 08/018,197;

(2) "A Method of Establishing a Connection", U.S. patent application Ser. No. 08/018,214;

(3) "A Method of Establishing Cooperation with a Functionality", U.S. patent application Ser. No. 08/018,268;

(4) "A Paging Method", U.S. patent application Ser. No. 08/018,212;

(5) "A Method of Supporting Communication", U.S. patent application Ser. No. 08/018,213.

TECHNICAL BACKGROUND

The term communication services is meant to mean conventional telephony services, telex services, datapack services, datel services, telefax services, videotext services, ISDN-services, mobile telephony services, personal paging services, tele-point-services and general communication between two or more parties. The services recited above are only examples of the services possible and are not intended to limit the scope of the invention.

The term telecommunication network is normally meant to mean the telephone networks, telex networks, circuit connected data networks, picture information transfer networks, private telecommunication networks, radio networks, satellite communication networks and general carriers of the communication services, such as analog transmission, digital transmission, synchronous, multiplex or asynchronous multiplex transmission, ATM, etc., for example. These networks are recited solely by way of example and the invention is not restricted thereto.

The term functionality is meant to mean the ability to perform an operation in a telecommunication network. Examples of functionality include activities and services that can be performed in the telecommunication network. Examples of functionalities include an enquiry to establish a connection path or route between two parties, digit analysis, billing or ticketing. Although not necessary, the functionality may require the availability of dedicated equipment for carrying out the functionality. For instance, if the functionality is to receive tones and to analyze tones, it is necessary to make a tone receiver accessible. Other examples of functionalities include voice-controlled speech information, number translation service, conference calls. Other examples of functionality include the functionalities described in the aforesaid five Swedish patent applications, namely communication in the form of a meeting, personal paging, a method of establishing cooperation with a functionality, meeting connection establishment and communication via intermediaries.

Still another example of functionality is the ability of being able to choose from among several alternatives.

The term connection is meant to mean a circuit-coupled connection or a package-coupled connection. The term to establish a connection is meant to mean in the circuit coupled case that a circuit-coupled connection is established between two hardware terminal devices (or equipment) and in the package coupled case it is meant that a package-coupled connection creates relationships between logic channels on node-interconnecting physical links which. The term to originate or to terminate a connection, is meant to mean in the circuit-coupled case to connect originating or terminating equipment to a circuit-coupled connection, and in the package-coupled case to create a session between applications in originating and terminating nodes respectively.

The term user is meant in the following to mean a human user or a computer-based application which utilizes communication services. The application may be achieved with hardware, software and combinations thereof. The word "part" is synonymous to the term user.

The term terminal is meant to mean equipment which is connected to a telecommunication network and which makes the telecommunication services of the network available to a user.

The term port either refers to an access port or to a transit port. An access port is a location where a dedicated terminal is connected to a telecommunication network. An access port is associated with a destination address which goes to an end user. In the case of a standard telephone network, the access ports are located in a telephone station. In the case of the ISDN-network and the mobile telephone network, the access ports are found in a terminal. A transit port is a port in a connection between nodes. A transit port is not associated with any particular destination address, and can be used to establish any selected connection with a final destination. The final destination is given by the destination address. A transit port can transfer a call to another node or can receive a call from another node.

The final destination of a call is a terminal which is identified by a destination identity. The terminal can be present in the same node as a transit port or in some other node to which the call shall be further connected.

One fundamental feature of present-day communication services is that when a party, hereinafter called A, wishes to communicate with another party, hereinafter called B, A sends a call to B, whereupon a connection is established between A and B. The call and the establishment of a connection route is a coupled sequence. That is the information which A uses in the call, namely information relating to the identification of B's access point in the telecommunication network, causes a connection route, or path, to be established between the parties. This connection can either be circuit-coupled or, in the case of non-continuous transmission methods, a so-called virtual connection, e.g. a package-coupled network, ATM-network (asynchronous transfer mode), etc. Traditionally, a connection is established by establishing a route from an origin to a destination. The connection route through the telecommunication network is controlled by fixed, so-called routing tables which are drawn up when configuring or reconfiguring the network. The routing tables may sometimes permit alternative selections, based on local accessibility information.

The traditional communication network is encumbered with many drawbacks. A first problem concerns handling of the resources of the communication network. Firstly, the communication network is, in itself, a resource which is utilized uneconomically in the traditional method of providing communication services. For example, when party A calls party B, so as to establish a connection through the network from A to B, and party B does not accept the call, the network resources have been used unnecessarily. The same applies when party B is engaged. The case is dependent on the predominant use of present-day networks of channel-associated signalling. This involves establishing a signalling connection, which is then used for speech purposes. With common channel-signalling, which is used primarily in the long-distance network, the signal connection is established with the aid of the data package, or packet, whereas the speech connection, the expensive part of the communication, is not established until B answers. Common channel-signalling is scarcely used in local networks. Secondly, the majority of all established connections do not require party B to act immediately on the information that A will transfer.

In the aforesaid cases, the network resources are either used unnecessarily or are utilized in real time, although it would be possible to utilize the resources at a later time.

Present-day telecommunication networks are constructed on the principle that only a limited number of all potential communication possibilities will be utilized simultaneously by users of the network. The telecommunication network is given an internal architecture so configured that common network resources are able to serve a limited number of users which avail themselves of said resources at one and the same time. Consequently, when a large number of users wish to use the resources simultaneously, the resources are insufficient and congestion occurs. The risk of a congestion being created is reduced by increasing the common resources. However, it is often expensive to increase the common resources. Consequently, an advantage is afforded when the desired communication can be redirected geographically or placed later in time, so that the communication can be effected in a manner which smoothens the traffic and reduces the risk of a congestion, without disadvantage to the users.

Another drawback with the known telecommunication networks is that when party A wishes to communicate with party B, it is necessary for party A to direct the call to the network, since the network must be activated in order to establish the connection with party B. In turn, this requires the network to have knowledge of the access port of party B in the telecommunication network. Furthermore, it is necessary for the telecommunication network to select the connection route between party A and party B. This is achieved with the aid of fixed routing tables. Fixed routing tables, however, are a disadvantage, for instance in the case when a large number of users located within a restricted, when local geographic area are called through the telecommunication network at one and the same time, resulting in congestion on certain trunk lines leading to the local area. On such occasions, the node will normally have several unused trunk lines from other geographic areas. The routing tables, however, do not permit these unused trunk lines to be used temporarily for the purpose of relieving the traffic to the local area. By way of example, heavy temporary geographic traffic concentrations can occur at large sporting events of a temporary character, among others.

Another drawback with known present-day telecommunication networks is that a network is unable to distinguish between whether A's call is answered by the person B or by some other person present in B's access port in the telecommunication network. When the network is the standard telephone network, this circumstance may occur in a conference locality in which several conference delegates are present and only one telephone rings each time one of the delegates is paged. In other words, the telephone network is unable to distinguish between the users.

When seen from the aspect of party B, present-day telecommunication networks are also rigid in structure and slow in redirecting the call to B when B moves from its access port in the telecommunication network. In present-day telephone networks, this problem is solved by service such as "temporary transfer" (diversion) or "redirection". However, if it is necessary for party B to change its access identity permanently, the problem will remain, i.e. that the party who wishes to reach party B must have knowledge of the new access identity. The mobile telephony solves this problem, but at the price of requiring the network to continuously register where B (or B's terminal) can be reached.

Present-day telecommunication services do not enable party A to call party B on a telecommunication network and establish communication with party B on another network separate from the first network. If B has access points in several telecommunication networks, it is necessary for party A to be aware of all of these access points in order to be able to use alternative ways of communicating with party B. If party B does not answer in one telecommunication network, it is necessary for party A to attempt to reach party B in another communication network. Thus, party A is forced to try network after network, before finally reaching party B. Naturally, it is necessary for party A to possess a list of B's access ports in the different networks at party B's disposal.

U.S. Pat. No. 4,933,966 relates to a telephone system comprising a microprocessor control system to automatically place collect calls without the need of a live operator. The telephone uses the microprocessor control system and a speech record/playback generator to receive a destination number and a recorded name from a user. The telephone uses the speech generator to play audio messages to prompt the user throughout the process. The phone informs a called party through a DTMF (dual-tone multifrequency) receiver. A communication path is established if the phone receives a response indicating the called party accepts the collect call.

This known telephone system operates well for its intended purpose, to place a collect call. The method used for establishing communication between the parties is of a one shot character. The called party is alerted and if he rejects the call the method ends. The calling party, however, has still a need to communicate with the called party. The telephone system has no way of recording this need.

SUMMARY OF THE DISCLOSURE

The inventor has found that many of the aforementioned drawbacks can be avoided by a novel type of communication in which two users, also referred to respectively as party A and party B, communicate indirectly via an intermediary M. The desired communication between A and B can then be handled by the network in two separate processes, namely one communication process from A to the intermediary M and another communication process from B to the intermediary M. With regard to both party A and party B, in this case respective parties communicate with the intermediary M and consequently the intermediary M need not know how party A and party B can be reached. In turn, the intermediary is comprised of a chain of mutually coacting intermediaries. In its basic form, this principle can be used for indirect communication, although in this case the possibility of direct interactive communication between party A and party B is lost. The intermediary is able to communicate with B without party A needing to know B's access port. However, if party B fails to contact the intermediary, party A's communication requirement remains and party A is forced to call again. Indirect communication between the parties means that party B can call the intermediary with the intention of checking whether or not a message directed to B shall be collected. Party A knows that the message shall be sent to the intermediary, but need not be aware of from where party B called the intermediary. In this case, the intermediary is passive and has the roll of the called party, both from A and from B. In one preferred embodiment of the invention, the intermediary may be given the duty of administrating interactive communication, by deciding when the two parties are available for interactive communication on the basis of the messages delivered to the intermediary by both parties, and therewith initiate such communication.

One object of the present invention is to utilize existing networks and the resources of existing networks more effectively than has been possible hitherto.

Another object of the invention is to provide a method of communication in which a call does not irrevocably result in activation of a network with the intention of establishing a connection route to the called party. The method shall also render it unnecessary for the network in which communication between the parties takes place to store and update the users' access points in this network. Furthermore, it shall be possible to select dynamically the connection route between the users, without needing to change the configuration-dependent, fixed routing tables of the network. A further object of the invention is to provide a method of communication which will enable selective personal communication to be achieved through an access port which may be used by several users.

Still another object of the invention is to provide a method of communication in which the calling party need not be aware of the access ports of the called party in all of the telecommunication networks at the disposal of the called party.

The aforesaid objects of the invention are achieved by establishing communication between the parties in the form of a meeting administrated by an intermediary, called a meeting broker. According to the invention, the communication service is divided into a separate negotiating phase and a connection establishment phase. The connection establishment phase is not initiated until both parties have accepted that communication shall take place and not until the access ports of the parties in respective communication networks have been made known to said parties.

The term separate is meant here to mean that the aforesaid coupled sequence between call and the establishment of a connection route is broken both in time and in space. That the coupled sequence is broken in time means that the negotiating phase of a communication service is separated from the establishment of a connection route. A connection route is not established until that time at which both parties are agreed that the communication phase of the connection shall commence. Consequently, the time at which a connection route is established will be delayed in relation to the time at which the call was made, although the invention does not exclude the establishment of a connection route in immediate conjunction with the time at which the call was made, provided that certain conditions are fulfilled.

Because the coupled sequence is broken in space, it is not necessary for the connection route between the parties to be established over the same telecommunication network as that, or those, over which the negotiating phase takes place. However, the invention does not exclude the possibility of retaining space coupling, i.e., does not prevent the same telecommunication network, or networks, over which the call was made, also being used in the communication between the parties.

By splitting the coupled sequence, a connection is not now considered as the establishment of a route from an origin to a destination. Instead, the connection is considered as the establishment of a route between two equal parties, wherein a route is established from A to B, from B to A or from A to an intermediate point M(A) and from B to an intermediate point M(B), whereafter M(A) is connected to M(B). The intermediate points M(A) and M(B) are placed on a telecommunication network which can be reached by both parties. Splitting of the coupled sequence also means that a call is considered to represent a service order or request. Traditionally, a call is considered an order for the establishment of a connection route to a destination. In accordance with the novel aspect, when party A dials a number on his telephone set, it is considered that party A is ordering a service, in this case negotiation for a communication service.

One characteristic feature of the inventive concept lying behind all six Patent Applications is that one party manifests his desire to establish communication with another party, by calling an intermediary which, depending on the communication service desired, either calls a meeting broker, a meeting organizer, a service order central, an electronic secretary or paging central, registers the call, allots the call an identification tag or sign, and negotiates with, or has already negotiated with the parties concerned regarding those conditions or terms on which the parties are prepared to accept an established connection therebetween. One such condition relates to the negotiation of a time at which a connection route between the parties shall be established so that the communication phase of the connection can be commenced, this time being a time which is suitable for both parties. Optionally, the third party may transmit the identification code to either party, so that said party is able to establish contact with the other party on a later occasion.

Because the intermediary is aware that both parties are prepared to commence the communication phase, the intermediary is able to cooperate in the selection of the place where the parties shall meet. This place can be located in the access port of the one party in one communication network, an access port for the other party in another communication network or in access ports in any selected telecommunication network to which both parties have access. The access ports of respective parties are connected together in this common telecommunication network. This provides a high degree of freedom in the selection of a meeting place, and the establishing of a route between the parties need not follow fixed routing tables, but can be chosen with regard to prevailing traffic conditions in the common networks at the disposal of both parties.

BRIEF DESCRIPTION OF THE DRAWINGS

The invention will now be described with reference to various exemplifying embodiments thereof and also with reference to the accompanying drawings, in which FIG. 1 is a block schematic which illustrates schematically two different environments in which the inventive communication method is applied;

FIG. 3 is a flow sheet illustrating schematically those sequences that can occur between a client and a broker respectively using the inventive communication method;

FIGS. 4–9 are detailed flow sheets covering the sequencies, or activities, illustrated in FIG. 3;

FIG. 10 illustrates those activities performed by a client during a meeting negotiating process;

FIG. 12 illustrates schematically the inventive communication method in conjunction with a conference conversation in which three parties take place;

FIG. 13 illustrates an example of a client's notification list;

DETAILED DESCRIPTION OF THE DISCLOSURE

FIG. 1 is a block schematic which illustrates two different environments in which the inventive communication method is applied. Both environments include a meeting broker 1, shown to the right of the broken line in FIG. 1, a client A of the meeting broker, shown to the left of the broken line in FIG. 1. The client may have different forms. For instance, in the environment shown at the top of FIG. 1, the client may either be a user A or the agent AG of said user, wherein the agent is in connection with the meeting broker via a telecommunication network N. In the environment shown at the bottom of FIG. 1, the client is a user A who is connected with his agent AG(A) via a network N. The agent AG(A) is, in turn, connected with the meeting broker 1 via a telecommunication network n which may be different to or the same as the aforesaid network N.

When a client A desires to establish communication with another client, called B, client A orders a meeting with client B. This order is made through an intermediary, the meeting broker 1. It is then the duty of the meeting broker to negotiate with clients A and B as to more precise conditions or terms under which the meeting shall take place, for instance such conditions as time, the form of the meeting, who is responsible for payment, etc. These conditions must be satisfied before the meeting can take place. When both clients are agreed that the meeting shall take place, the broker 1 initiates the establishment of a connection between client A and client B.

The upper section in FIG. 1 views the situation from the aspect of the meeting broker. For instance, the illustrated user A may either be A or B, or A's agent AG(A) or B's agent AG(B). The meeting broker negotiates with the client, indicated by the pair of arrows F1, negotiations number 1.

In the bottom section of FIG. 1, two negotiating processes are carried out, namely the process marked with the pair of arrows F1 and the process marked with the pair of arrows F2. Negotiation F1 takes place between the broker 1 and its client, A's agent or B's agent. The second negotiating process takes place between the agent and the agent's employer or customer. The customer of agent AG(A) is the user A and the customer of agent AG(B) is the user B.

Figure 2:
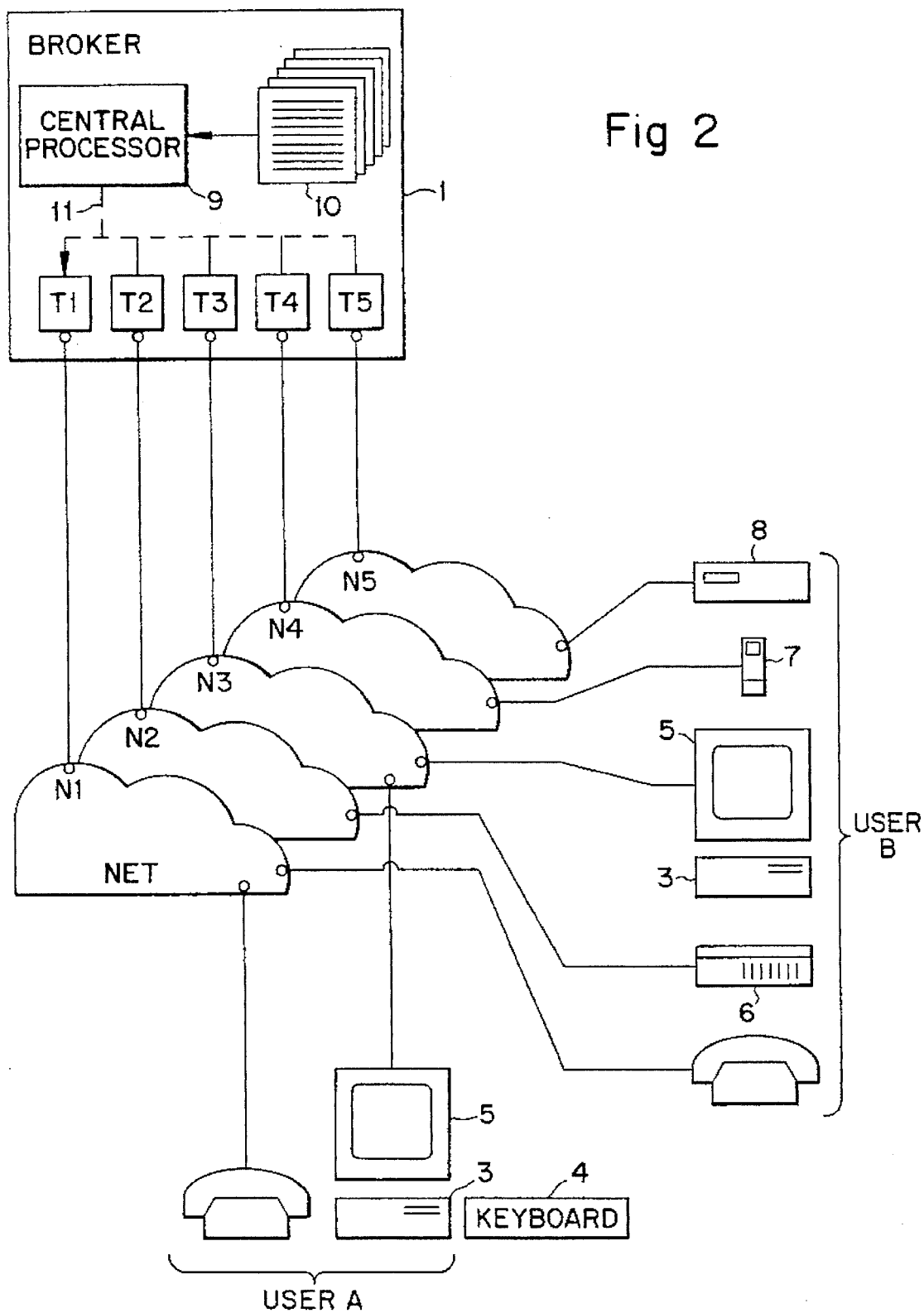
FIG. 2 is a block schematic which illustrates schematically different terminals included in a communication system which utilizes the inventive communication method.

FIG. 2 is a block schematic which illustrates the upper section of FIG. 1. Two clients A and B subscribe to services in different telecommunication networks N1–N5. The network N1 is the standard telephone network, the network N2 is the telex network, the network N3 is a packet switching data network, the network N4 is the mobile telephone network and the network N5 is a person-paging network, e.g. a radio network. Client A subscribes to services in networks N1 and N3, whereas client B subscribes to services in all networks N1–N5. Client A has a conventional telephone and a terminal unit which affords A access to the packet switching data network. This terminal unit is shown symbolically and comprises a central unit 3, a keyboard 4 and a display screen 5. Client B also has a telephone, a telex apparatus 6, a terminal unit connected to the packet switching data network, this terminal network also being shown symbolically and comprises a central unit 3, a keyboard 4 and a display screen 5. Client B has a mobile telephone 7 which is connected to the mobile telephone network N4. Finally, client B has a paging receiver 8 which is connected to the paging network N5.

The meeting broker 1 includes a number of terminal units T1, T2 . . . T5, a central processor 9 which is controlled by a number of program modules illustrated schematically at 10. The terminal unit T1 is connected to the network N1, while terminal T2 is connected to network N2, and so on. As each terminal unit T1–T2 is intended to handle thousands of connections simultaneously, the broker terminal units T1–T5 differ from clients' terminal units T1–T5. For instance, the terminal unit T1 may be a telephone exchange in the meeting broker 1, whereas clients' terminal units may consist of conventional telephones. Similarly, the illustrated terminal unit T2 is a switch, whereas the corresponding terminal units belonging to the clients are conventional telex apparatus. It will be understood that the terminal units T1–T5 may, in turn, include software-controlled processors. The central processor 9 has software for carrying out the meeting negotiation, as described in more detail herebelow, and may be connected to several different networks so as to serve as a gateway, as marked symbolically by the broken lines 11. The central processor 9 may be co-localized with either client.

FIG. 3 is an overall view of the basic activities that can occur with a client A or B and with the broker 1. Normally, nothing takes place and the client and the broker then find themselves in a so-called basic state, indicated by a double full-line. When a client wishes to be connected with another client, the client initiates the inventive communication process. Clients A and B are then two equal parties which negotiate with the broker 1 with regard to the more precise conditions under which communication shall take place. The communication is established in the form of a meeting between A and B. In order for the meeting to take place, the broker 1 carries out two meeting negotiation processes, one with each client A and B. Thus, a total of three parties, A, B and the broker 1, are involved in setting-up a meeting, and two meeting negotiation processes are carried out.

Four different types of activities can occur with respect to client A or client B from the basic state of the system. The user either wishes to establish communication with another user, route 12, and accordingly places an outgoing order for a new meeting, route 13. This order is handled in the manner illustrated in FIG. 4. A client may also receive an order for communication from another client. This order is delivered by the broker according to block 14 in FIG. 3. The manner in which the client deals with this incoming order is illustrated in block 15, which is shown in detail in FIG. 5. A client may also wish to change his mind with regard to the form in which the meeting shall take place, as shown in block 16. A client who has earlier requested for a meeting to take place may, for instance, be detained and wish to postpone the meeting and now informs the broker 1 to this effect. The manner in which a client updates or makes known his desires in this respect is shown in block 17, this block being explained in more detail with reference to FIG. 6. The basic state of a client may also be changed, because he receives from the broker a request to negotiate with the client the forms in which the meeting shall take place, block 18. The manner in which such a negotiation request from the broker is handled is shown in block 19, which is described in more detail in FIG. 7. As shown in FIG. 3, the basic state of the broker may be changed as a result of two different activities, viz a request to switch a communication request to another client, block 20. The manner in which this request, or order, is switched is shown in block 21, said block being described in detail with reference to FIG. 8. The other activity in which the broker may be involved is one in which a client wishes to change the form of the meeting, block 22. The broker must now update those conditions under which the client wishes to communicate with another client. The manner in which this updating takes place is shown in block 23, said block being described in more detail with reference to FIG. 9. The desire of the client to update the meeting, block 17, thus arrives at the broker in block 22. When the client, or user, requests a meeting, block 13, this request is received by the broker in block 20.

Those blocks which are identified by a convex arrow on one side imply that a signal is transmitted from the unit that is controlled by an assignment process which performs those activities stated in a block. Subsequent to the transmission of this signal, a further assignment process is performed in said unit, with new activities as denoted by an arrow which points vertically downwards. Correspondingly, a block which is identified by a concave arrow, for instance block 20, implies that the unit controlled by an assignment process which performs those activities stated in the block receives a signal. Upon receipt of this signal, a further assignment process takes place in the unit with new activities, as indicated by the vertical arrow extending downwards from the block concerned. Although a client or broker may have left the basic state as a result of any one of the aforesaid six activities, the client and the broker will always return to the basic state.

Figure 4:
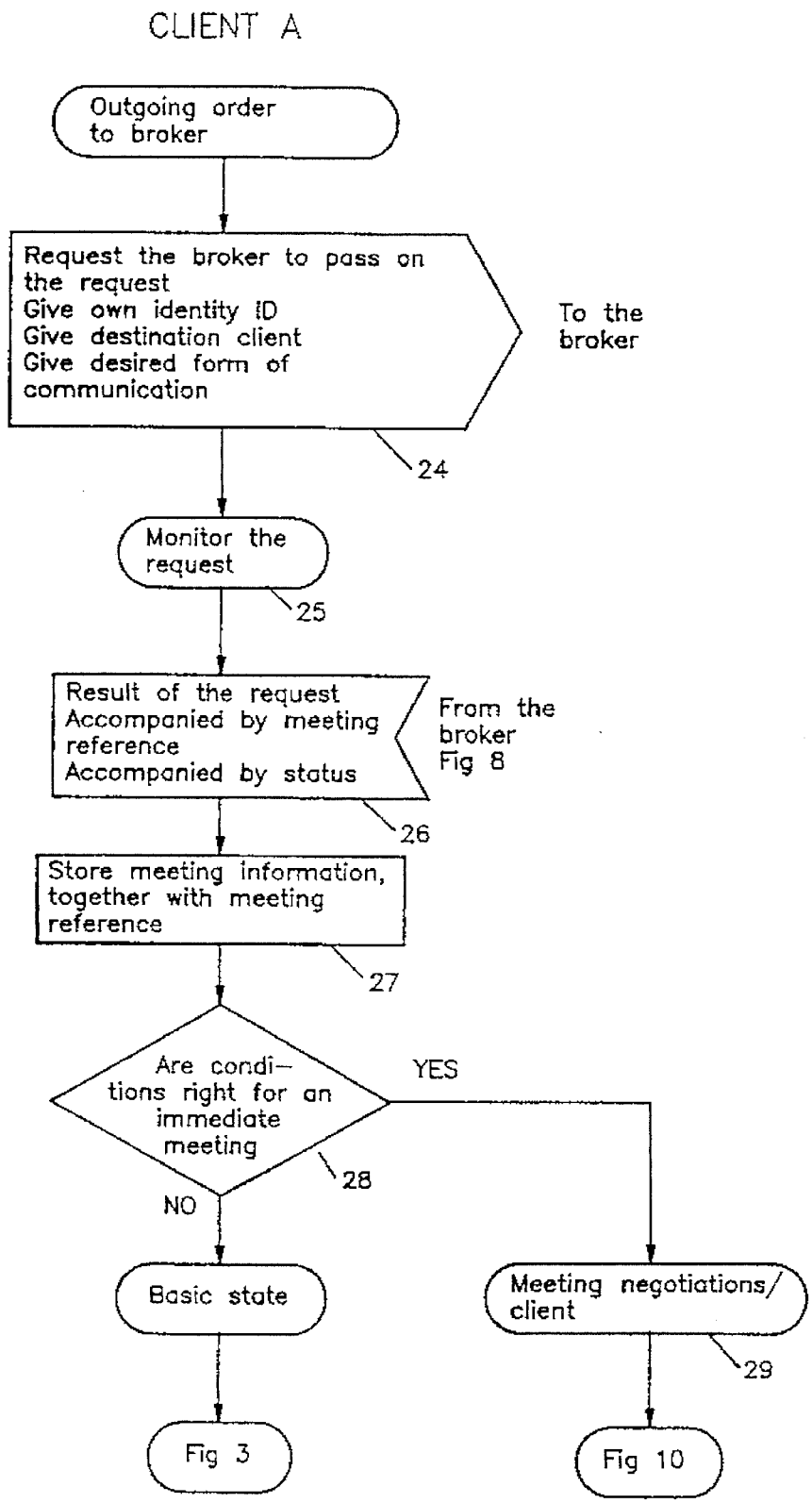

FIG. 4 illustrates those steps which are taken when a client A makes an outgoing request for communication with B. Client A, also called meeting broker or customer client, sends the request to the broker. It is thus client A who takes the initiative in establishing a meeting. When the client A has decided to establish a meeting, he enters a sequence of events in which he contacts the meeting broker 1, block 24, and requests a meeting. In this regard, the client is required to state his own identity and also the identity of the person with whom he wishes to communicate, in this case the destination client B. The client A is also required to state the form of communication desired, i.e. whether the meeting shall be interactive or indirect. An interactive meeting requires the establishment of a duplex connection between A and B. Indirect communication implies that client A, i.e. the person wishing to establish a connection, merely wishes to send a message to client B, wherein this message can be stored at some appropriate place, either with A, B or in some other specified place in a specified network. The destination client B is then able to collect the message at a time which suits him and, optionally, to leave a message in reply. Thus, in this case, the main issue is to establish a simplex connection between client A and the meeting broker 1. The manner in which such indirect communication is achieved is described in Applicant's copending patent application Ser. No. 08/018,212 entitled "A Paging Method". The client A requesting the meeting then waits for a reply from the broker 1, block 25. Client A then receives from the broker the result of a meeting request, block 26. The client A is now given a meeting reference, also called meeting identification, MID, which relates the client to the meeting concerned and also to the destination client B. Client A also receives information concerning the status of the requested meeting. The status may either be that destination client B wishes the meeting to take place, wherein the status is OK, or that the destination client B rejects the request for a meeting, wherein the status is NO. The status may also include information as to whether the meeting is interactive, INT, or indirect, IND. When client A is in possession of the result of his request, or order, he stores the meeting information together with a meeting reference, block 27. This information and reference can be stored in many different ways. For instance, the information and reference can be noted manually with the aid of pen and paper. It can also be stored in a working memory, for instance, in a terminal unit at the disposal of client A. The meeting information and reference may also be stored in a separate electronic unit equipped with a memory and a display facility on which the information can be read. This electronic unit may, for instance, be a conventional so-called pocket memory. Other known message storage devices may also be used, such as Voice Response, Voice Mail, Voice Operator. Client A stores meeting information continuously, i.e., meeting after meeting. Client A may, himself, have received a request for a meeting from another client, and then stores the meeting reference with accompanying status in the same storage site. In this way, the client forms a list of the meeting references of the different meetings, for instance, a list of the kind illustrated in FIG. 13.

Depending on the status of a meeting, the client A now assesses whether or not the conditions allow a meeting to be established immediately, block 28. If client A wishes a meeting to be established immediately, he informs the broker to this effect, block 29. The broker then negotiates for a meeting to be held, as described in more detail with reference to FIG. 10. If prevailing conditions do not allow for a meeting to be established immediately, client A informs the broker to this effect and the activities concerning client A now return to the basic state shown in FIG. 3, wherein the requesting client A is able to inform the broker continuously of his attitude towards the meeting.

Although FIG. 4 illustrates the activities of A when A wishes to make an outgoing request, or order, it will be understood that the same activities are performed by B towards the broker 1, when B wishes to make an outgoing request or order. As will be seen from FIG. 3, both the client A and the client B can be updated by the broker with information concerning their respective attitude towards a proposed meeting.

By way of summary, it can be said that alternative NO, choice block 28, implies that the broker deletes all of the times at which both client A and client B do not desire a meeting to take place. The YES-alternative in block 28 implies that both clients A and B wish for a meeting to take place and also that further negotiations are undertaken concerning the conditions or terms under which the meeting shall be arranged.

Figure 5:
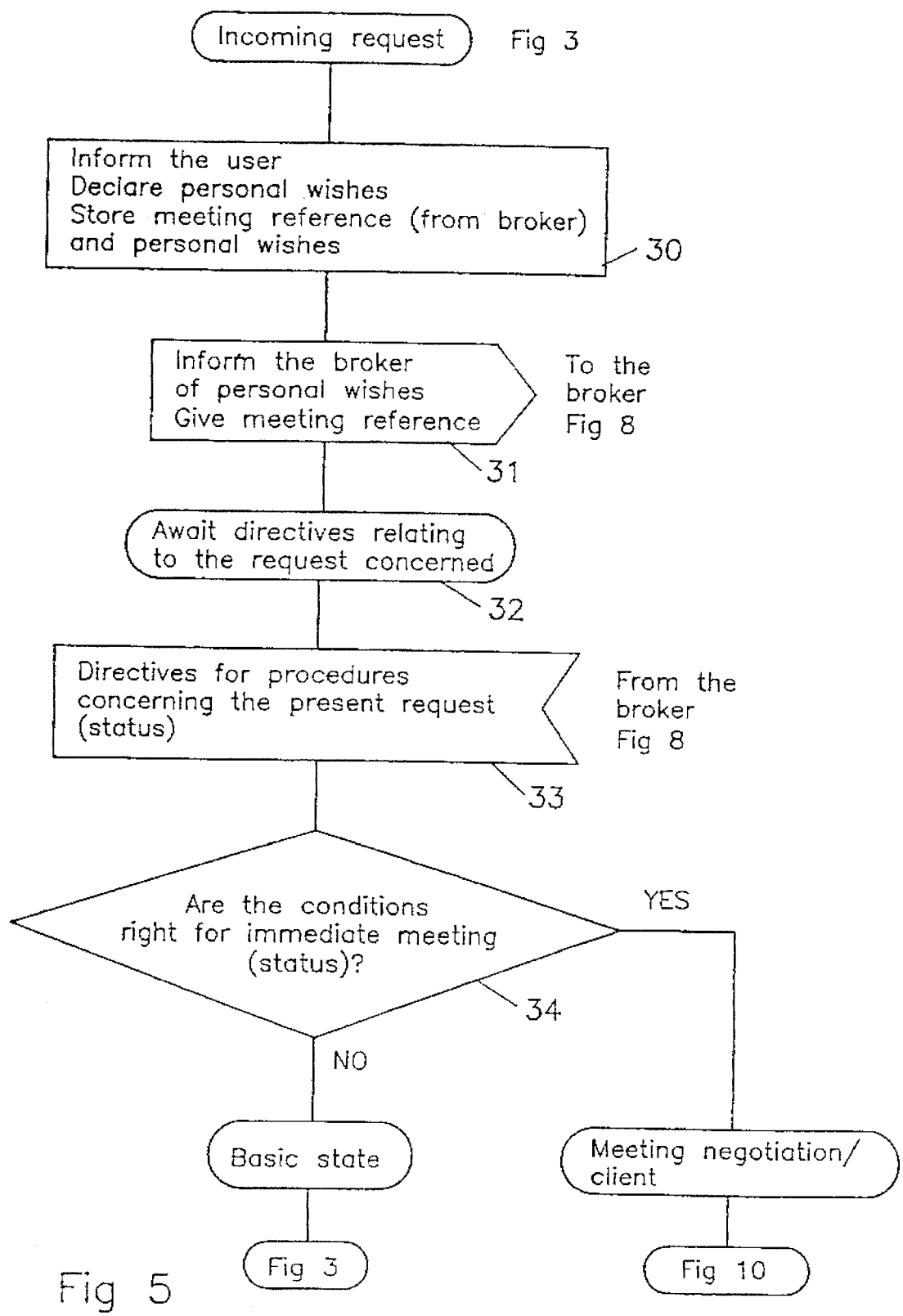

FIG. 5 illustrates the activities concerning when a client B receives an incoming meeting request of which no prior notice has been given. In this case, the broker has dealt with A's request for a meeting and now offers the meeting to client B. It was client A who requested the meeting and client B is therefore called the destination client. The broker now informs the destination client B that client A wishes a meeting, which may be either interactive or indirect. The destination client B now takes a position with regard to the requested meeting, i.e., expresses his own wishes and terms, and also obtains from the broker the meeting reference allotted by the broker to this particular meeting and of which the client A, who has requested the meeting, is also aware. This meeting reference is stored in the call list, in a manner corresponding to the way in which client A, requesting the meeting, stores his meeting reference. All this is described in block 30. The destination client B then informs the broker 1 of his wishes concerning the proposed meeting, while stating the meeting reference relevant hereto. This is described in block 31. The destination client B then waits for a directive with regard to the meeting request concerned, block 32. The broker 1 has been earlier made aware of the attitude of client A, who requested the meeting, with regard to the proposed meeting and the broker will now ascertain the attitude of destination client B to the meeting. The meeting broker analyzes the conditions for a negotiation between A and B with regard to the meeting conditions specified. Destination client B now awaits a directive from the meeting broker with regard to possible procedures concerning the request in question, block 33. If the meeting broker states that conditions are found for an immediate meeting to take place, block 34, alternative YES, a meeting negotiation is carried out in the same manner as earlier described, block 29. If no conditions are found for an immediate meeting, alternative NO in block 34, the destination client B returns to the basic state shown in FIG. 3.

Figure 6:
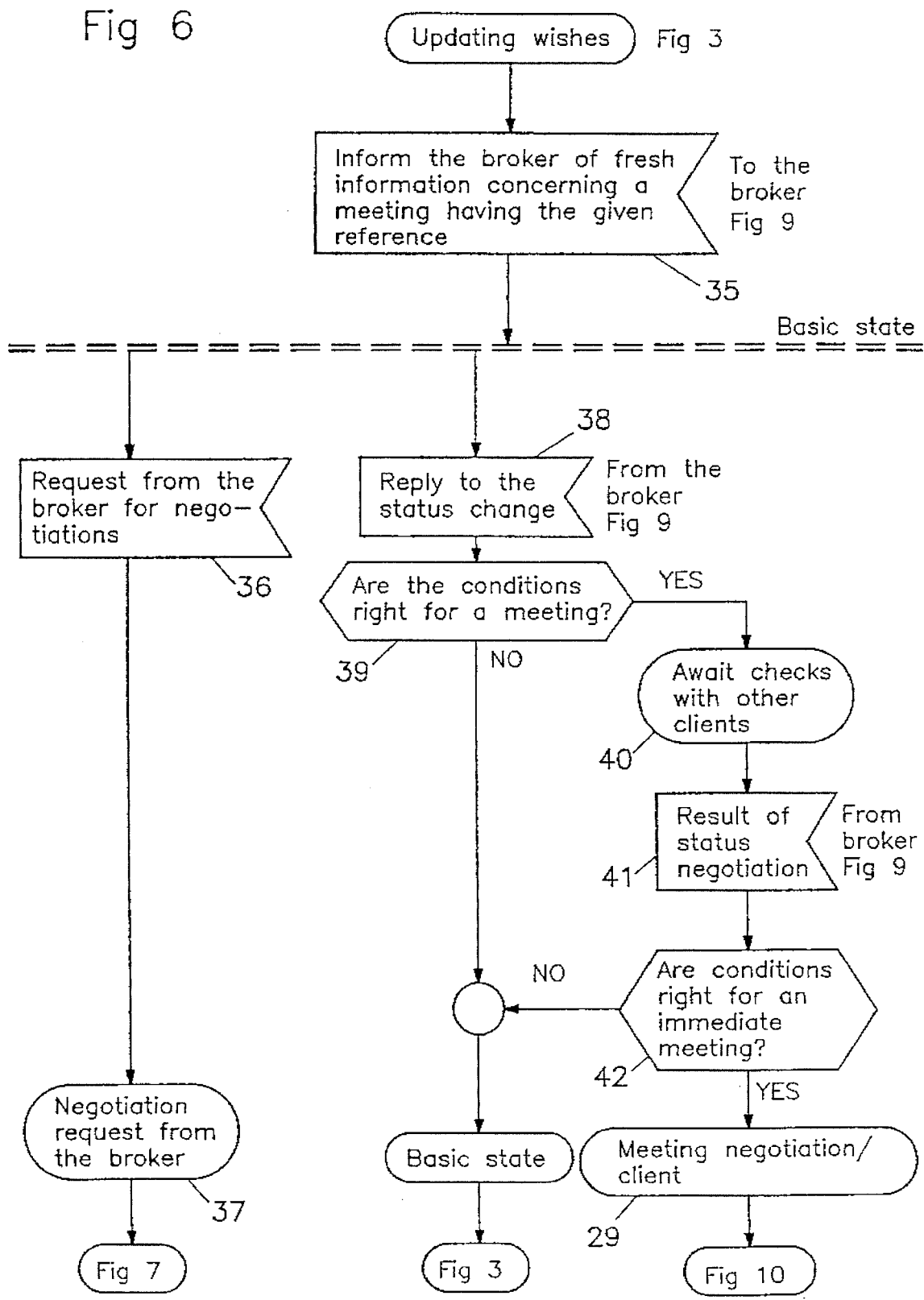

FIG. 6 illustrates the activity in which a client A or a client B wishes to change his mind concerning a proposed meeting. The client who wishes to change his mind with regard to the meeting furnishes the meeting broker 1 with new information, while stating the meeting reference. This takes place in accordance with block 35. The client returns from block 35 to the basic state, marked with a double broken-line, and the client then receives a reply from the broker, block 38, if the client is one of the two clients involved in the meeting who first requested their wishes to be updated. If both clients have requested updating simultaneously, something which can be likened to a race-track takes place between the alternative which begins at block 38 and the alternative which begins at block 36. The alternative given in block 36 implies that the meeting broker has analyzed the conditions under which a meeting shall take place and has found that both clients A and B are now prepared to negotiate on the more precise nature of the conditions under which the meeting can take place. Both clients now receive a negotiation request from the broker, block 37. The manner in which this negotiation takes place is described in more detail below with reference to FIG. 7.

The reply to the change in status, block 38, may require the meeting conditions to be changed. This is described in block 39. If the conditions remain unchanged, alternative NO, there is a return to the basic state. If the reply to the change in status is YES, block 39, the new updating means that both clients have agreed that negotiations shall take place. The meeting broker then first checks whether the opposite party, block 40, (A or B), is still prepared for a meeting to take place. The reason why this check is made is because some time may have lapsed since the counter-party has informed the broker of his attitude to the meeting. After block 40, the broker is able to negotiate with the counterpart with regard to his attitude towards the meeting, and the result of this status negotiation, block 41, is passed onto the client whose wishes were updated, and if conditions are now found under which a meeting can take place immediately, block 42, alternative YES, both of the clients will then enter into a meeting negotiation, block 29. If there are no conditions under which a meeting can be held immediately, block 42, alternative NO, the client who updated his wishes then returns to the basic state, according to FIG. 3.

Figure 7:
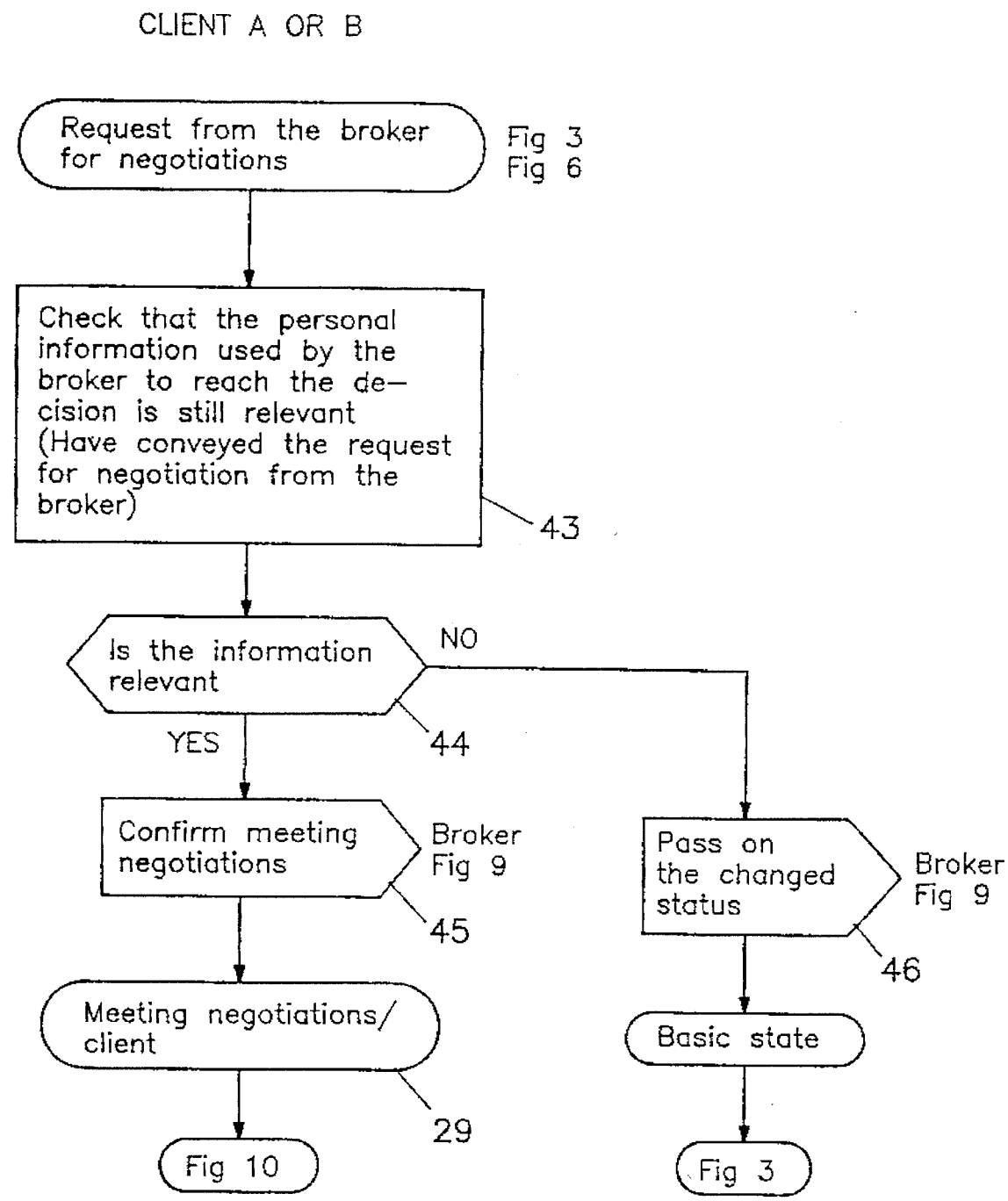

FIG. 7 illustrates a course of procedures in which the meeting broker sends a negotiation request to either client A or client B. The broker sends this request in order to confirm that a client is still interested in a meeting taking place. In this stage of the procedure, the broker is in possession of current information now discloses how one of the clients-parties views the meeting, whereas information relating to the other client or party is old information. In other words, the broker wishes to check whether or not the old information concerning said client, i.e., the information concerning the attitude of the client to the meeting, still applies and that the client does not wish to cancel the meeting. The broker then sends the fresh, current information to the opposite party, i.e., the client whose information, while admittedly being current, is also old. The broker asks whether or not the information stored concerning client's attitude towards the meeting still applies. This takes place in block 43. If the information is still current, block 44, alternative YES, the client confirms that he does not wish to amend the information stored by the broker, block 45. Since the two clients A and B wish for the meeting to take place, a meeting negotiation procedure takes place between the clients with the meeting broker as an intermediary, block 29. On the other hand, if a client, e.g. A, wishes to change his attitude towards the meeting upon receipt of this negotiating request from the broker, block 44, alternative NO, the client A informs the broker to this effect, block 46, and the client A returns to the basic state according to FIG. 3.

FIG. 8 illustrates the procedure performed by the broker when the broker receives a request to arrange a meeting. The broker is implemented in the form of a central processor, software and hardware, by means of which the various assignment processes are carried out, the establishment of a meeting being one of these processes. In response to the request for a meeting, this assignment process creates an individual which is referred to in the following as the meeting individual. In order to enable other assignment processes to refer to precisely the meeting individual concerned with the meeting between A and B, the meeting individual is christened and is given the aforesaid name, meeting reference or meeting identification MI. Information concerning the wishes of the client requesting a meeting with regard to forms of communication, block 47, is stored in the meeting individual. This information may relate to the wishes of the person requesting the meeting for the connection to be established with the destination client through one of the telecommunication networks at the disposal of the requesting client. Other meeting forms, i.e., interactive or indirect meetings, are stored in the meeting individual. The meeting individual is substantiated in the form of memory positions in the central processor. For instance, the meeting individual may consist of a data record having several different fields. As before mentioned, the meeting individual may also be one instance or individual in a group.

Once the meeting individual has been created, notice of the meeting request is given by the broker to the destination client B. In sending this notice to the destination client, the broker 1 sends, through a suitable network N1–N5, an alert signal to the destination client who, upon receipt of the alert signal, makes contact with the broker 1, who then sends the meeting request to the destination client B, block 48. The broker monitors the request, or order, as described in block 49. In principle, nothing will now happen until the destination client B responds to the request. The destination client B elects to reply to A's request for a meeting when it suits B. Client B has the request stored in his call list, or diary page, in FIG. 13, and can contact the broker to give his reply or to change his earlier attitude towards a meeting, at any time whatsoever. When the broker receives a reply from the destination client, the destination client gives the meeting reference, so that the broker is able to identify the meeting concerned, and also his wishes. These wishes may concern the communication network over which the destination client wishes to speak with the client A who requested the meeting. This communication network need not be the same as that in which B answers, nor yet that in which the requesting client A makes his request. Neither need it be the telecommunication network in which the destination client B has communication equipment, but may be a network which client B can reach via a gateway. In other words, the coupling halves of a connection may lie in different telecommunication networks. Furthermore, the destination client discloses his access port in the telecommunication network desired. When the broker receives the reply of the destination client, block 50, the broker analyzes the conditions under which a meeting negotiation shall take place, block 51. Depending on these conditions, the destination client B may receive a directive concerning the procedural steps to follow with regard to the meeting in question. For instance, the destination client may be ordered to return to the basic state and await instructions from the meeting broker, in accordance with block 52. The party requesting the meeting may also obtain a directive concerning procedural steps as a consequence of his request, block 53. When the analysis made according to block 51 shows that conditions are found under which a meeting can be arranged immediately between the clients, choice block 54, alternative YES, the meeting broker initiates a meeting negotiation between the client A and B, block 55. If no conditions are found under which a meeting can be organized immediately, choice block 54, alternative NO, i.e., one, the other or both clients does not, or do not, desire a meeting to take place, the broker returns to the basic state according to FIG. 3.

FIG. 9 illustrates a sequence of activities performed by the meeting broker 1 when one of the clients A and B changes his attitude towards the meeting. Block 56 illustrates the activity in which the broker receives a message that one of the clients has changed his attitude towards a given meeting. The broker then carries out a state analysis, block 57, in which the conditions are analyzed to ascertain whether or not a meeting negotiation is of current interest, block 58. For instance, the following events may occur: first, one client desires a meeting to take place, whereas the other client rejects the meeting. The second client then changes his mind and desires a meeting to take place, although the first client has now changed his mind and no longer wishes a meeting to take place. The broker now ascertains whether conditions are found under which a meeting negotiation can take place, block 59, alternative NO, and if no grounds for negotiation exist returns to the basic state, FIG. 3. If conditions are found in which a meeting negotiation can take place, block 59, alternative YES, the broker sends a negotiating request to the second client, i.e., to the client who did not initiate updating. This takes place in block 60 and implies that the broker now seeks confirmation from the second client that said client truly wishes for a meeting to take place. Depending on the answer from the second client, two cases can occur: First, second client informs that he has changed his earlier declared attitude, block 63, whereupon the meeting broker now updates the status of the second client in the meeting individual, block 64, and carries out a renewed condition analysis, block 65. In the second case, the client questioned confirms that his attitude to the meeting is unchanged, block 61. The meeting broker then informs the client who initiated the updating of the result of the status change of this client, block 62, and the broker is now able to pass to the meeting negotiating stage, block 55. The procedure followed by this meeting negotiation process is shown in detail in FIG. 11.

FIG. 10 illustrates those activities which take place in conjunction with a meeting negotiating process seen from the aspect of a client. Both clients carry out the procedures shown schematically in FIG. 10 when requested to negotiate by the broker. Compare FIG. 4, block 29, FIG. 5, block 29, FIG. 6, block 29, FIG. 7, block 29. In response to the broker's inquiry, the client (A or B) informs the broker of the telecommunication network or networks on which he desires the meeting to take place, and also informs the broker of his access ports in respective telecommunication networks. The client also discloses to the broker whether or not he is willing to pay for the communication. For instance, a client may undertake responsibility for the total cost of a meeting, half the cost of a meeting or may accept no payment responsibility at all. When the broker is in possession of the aforesaid information, block 66, a client has thus chosen the meeting conditions from the group of conditions that consist of the time at which the meeting shall take place, the form of the meeting, those telecommunication networks via which the client wishes the connection to be established, and payment responsibility for the meeting. When the client chooses the form of the meeting, this means that the client has chosen conditions from the following sub-group of conditions:

(1) has accepted an interactive meeting, meaning that the destination client B is agreed that the meeting shall take place;

(2) has rejected an interactive meeting, meaning that the destination client B has said NO to an interactive meeting, but that the requesting client A and the destination client B have not excluded the possibility of establishing communication with the requesting client in some other way;

(3) has accepted an indirect meeting, which means that the destination client B agrees to communicate with the requesting client, via indirect communication, for instance through the medium of messages over a telecommunication network; and (4) has rejected an indirect meeting, which means that the destination client B does not wish to establish communication with the requesting client A.

The condition whereby an interactive meeting is accepted includes one of the following possibilities:

(a1) an immediate interactive meeting, meaning that the requesting client A desires the meeting with destination client B to take place immediately; or (a2) a negotiated interactive meeting, meaning that the destination client B desires the meeting to take place, but at a later time suitable both to him and to the requesting client A.

The condition "accept indirect meeting" implies the following possibilities:

(i) that the requesting client A informs the meeting broker of a first reference to a first storage place in a network and the requesting client A records a message at said first storage place, that the broker forwards the first reference to the destination client B, and the requesting client A collects the message, while using the first reference, at a time suitable for the requesting client;

(ii) that the destination client B supplies the broker 1 with a second reference to a second storage place in a network, that the requesting client records a message at said second storage place, and that the destination client B collects said message on a later occasion; and (iii) that the meeting broker supplies the requesting client A with a third reference to a third storage place in a network and that the requesting client records a message at the third storage place; that the meeting broker provides the destination client B with the third reference to the third storage place, and that the destination client collects the message at the third storage place at a time which suits the destination client.

This type of indirect communication implied by an indirect meeting can be related to an electronic mailbox. The mailbox is thus located at the message storage place and is comprised, for instance, of a data base in which the message is stored under the aforesaid meeting reference described with reference to FIG. 8. The destination client B is able to collect the message from the mailbox, by giving the meeting reference. The mailbox may also consist of a voice-controlled device which delivers the message in the form of human speech when the destination client discloses the meeting reference. The possibility of locating the storage place at the meeting broker, with the requesting client A or even in some other storage place in some other node in the network in which the client communicates or in any other selected network from which the message can be collected by the destination client, means, for instance, that the available memory space of the destination client B and the capacity of the memory to store messages which the destination client B has not ordered will only be loaded to the least possible extent.

When the broker has noted those communication alternatives that are possible in order for the clients to be mutually connected, the broker offers these possible communication alternatives to the clients (A or B) concerned, block 67. The clients consider these alternatives and decide to accept one or more of said alternatives, block 68, and inform the broker of their wishes, block 69. The clients then return to the basic state, marked with the double, vertical full-lines in FIG. 10. Three alternatives can now occur. The broker may find that the clients' conditions are not mutually compatible and that communication between the clients is therefore not possible, block 70, whereafter the relevant client (A or B), after having learned of this incompatibility, block 70, returns to the basic state. One reason as to why communication is not possible, may be because the clients cannot agree on who shall pay for the communication set-up. In this case, the broker may suggest that one of the clients modifies his wishes. For instance, the broker may say that the meeting can take place provided that the destination client B pays half the cost, because the customer client has said that he is prepared to pay half the cost himself. The clients receive the broker's suggestion that conditions, or wishes, are modified, at block 71. The broker may find, finally, that the clients' conditions are mutually compatible and that communication between the clients can take place. The broker then informs the clients as to how the connection shall be established, block 72. The meeting broker can order the destination client B to establish a connection with customer client A, or order the customer client A to establish a connection with the destination client B, or order both clients to call their respective access port in a common telecommunication network, whereafter the purpose of the meeting broker is to ensure that these two access ports are mutually coupled, so as to connect the clients together. It is thus evident that the connection is established between two equal clients and not as a connection from the customer client A to the destination client B, as is at present conventional in present-day telecommunication networks. This is made possible because the meeting broker is aware at that moment in time that both clients are available for a meeting. This method of procedure prevents the network from being loaded unnecessarily when establishing connection routes to a client who is absent from his terminal at that time.

The client (A or B) then carries out the procedures necessary to establish a connection, block 73, whereafter the client registers the status of the meeting, in his call list, or diary page, namely that the meeting is established. Communication between the clients now take place. Upon completion of this communication, the clients return to their basic state, as in FIG. 3. As the clients communicate with one another, one of the clients may wish to adjourn the meeting to a later time or date. It is therefore not advisable to erase the meeting reference from the call list before the meeting has been terminated. The clients will wish to refer to precisely this meeting at the time at which the adjourned meeting shall be recommenced.

Figure 11A:
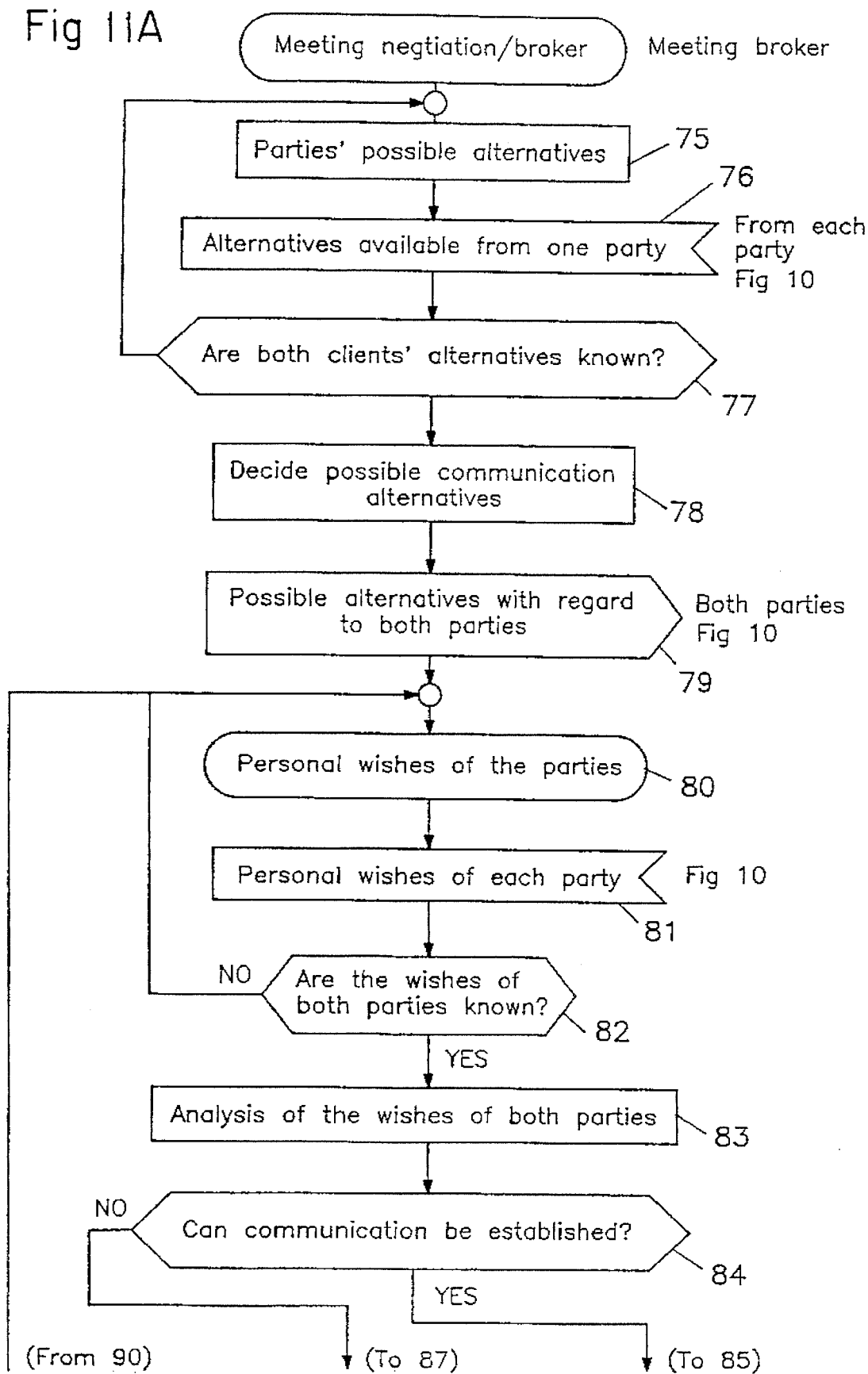
FIG. 11 is a flow sheet illustrating those activities performed by the meeting broker during a meeting negotiating process.
Figure 11B:
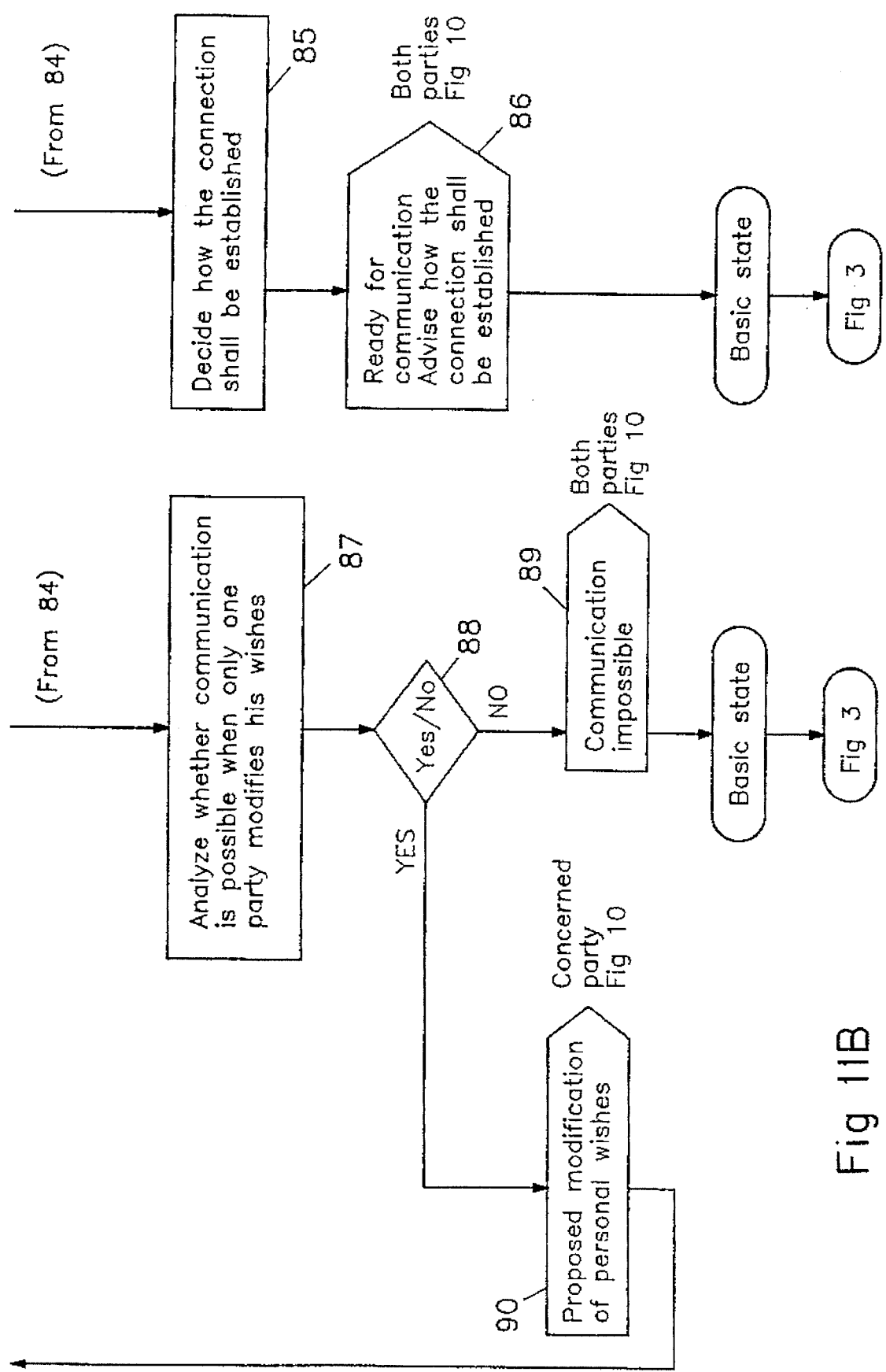

FIG. 11 illustrates the sequence of activities performed by the broker during meeting negotiations. These procedures and activities have been described earlier and are now illustrated schematically in FIG. 11. The broker begins meeting negotiations by first being informed by the clients which alternatives are possible, block 75, and is also informed by respective clients (A or B) of those alternatives which are available, such as the terminals at the disposal of respective clients, payment responsibility, the form of the meeting, etc., block 76. If the alternatives of the two clients are not known, the missing information is collected, choice block 77, alternative NO., If the alternatives of both clients are known, block 27, alternative YES, the broker then analyzes the possible communication alternatives, block 78, and checks which communication alternatives would function between the clients. This takes place in block 78. The broker then informs the clients of the possible alternatives, block 79. The broker shall now collect the personal wishes of the clients, block 80, and obtains these wishes from each client, block 81. It is decided in block 82 whether or not the wishes of both clients are known. If these wishes are not known, it is necessary for the broker to question the client whose wishes are not known, choice block 82, alternative NO. If the wishes are known, alternative YES, the process is continued and the broker analyzes the clients' wishes, block 83. On the basis of this analysis, the broker ascertains whether or not communication can be established between the clients, choice block 84. If communication can be established, the meeting broker decides how the connection between the clients shall be established, block 85. This more precise information as to how the connection shall be established is delivered to the clients, block 86, as described above with reference to block 72 when the connection has been terminated, the broker returns to the basic state, in FIG. 3. If communication cannot be established between the clients, choice block 84, alternative NO, it is necessary for the broker to analyze whether or not communication between the clients is possible, if either one of the clients (A or B) is willing to modify his wishes, block 87. This analysis may result in two different cases, choice block 88. If the broker finds that communication can be established between the clients, provided that one of the clients modifies one of his conditions, or wishes, choice block 88, alternative YES, the broker will then suggest this modification to the client concerned, block 90. This block has been described earlier with reference to block 71 of the FIG. 10 illustration. On the other hand, if the condition shows that communication between the clients is impossible, despite the proposed modifications, the broker informs both clients to this effect, block 89, and the broker then returns to the basic state shown in FIG. 3.

FIG. 12 illustrates schematically the procedures followed by the meeting broker in the case of a conference connection in which three or more clients wish to communicate with one another at one and the same time and on one and the same telecommunication network. It is also possible to carry out the conference with a client who uses one telecommunication network and other clients which utilize other telecommunication networks, provided that the broker functions as a gateway or organizes gateways between the clients. Assume that one user, called client 1, wishes to confer with two other users, called clients 2 and 3. When client 1 requests a meeting through the broker and discloses that the meeting concerned is a conference communication, the meeting broker creates a fictive meeting client for each of the clients concerned with the conference. This fictive meeting client is called conference agent 1, conference agent 2 and conference agent 3 respectively. From the broker's aspect, three meetings shall be arranged, meeting 1 between client 1 and conference agent 1, meeting 2 between client 2 and conference agent 2, meeting 3 between client 3 and conference agent 3, and so on. It is now the task of the broker to organize matters so that client 1 will be present when client 2 is present and when client 3 is present, and so on, when each of the clients concerned is positively inclined to the proposed meeting. When one client, for instance, client 1, changes his attitude with regard to the proposed meeting, and informs the broker of his change of attitude, in accordance with the FIG. 9 flowsheet, and sends a negotiating request to conference agent 1 in accordance with block 60. However, the conference agent 1 is also aware of the attitudes of conference agent 2 and conference agent 3 to the proposed meeting, as the conference agents are meeting individuals, each of which behaves as a conventional counterpart in a conventional two-party meeting. By assessing the attitudes of the conference agents to the meeting, the broker is able to set a time at which all clients wish the meeting to take place and therewith inform each of the clients as to how the connection shall be established, in accordance with block 72 in FIG. 10.

When the communication concerned is a conference communication which involves several clients, each client can be ordered to call the remaining clients, or all clients can be ordered to call their respective access ports in a telecommunication network in which the access ports are coupled together upon receipt of an order from a meeting organizer 97, described herebelow.

FIG. 13 illustrates an example of a call list 91, in which the meeting identification (=meeting reference) includes a numerical reference which clearly relates a specific meeting to a specific customer client and a specific destination client. For the sake of clarity, it is also suitable to state in clear text the destination and from where the meeting notification was received, i.e., the sender, as shown beneath the headings destination and sender respectively. The call list also includes information concerning the status of the meeting, the type of meeting and when the meeting shall take place. If the reader is the person who possesses the call list 91, it will be evident from the list that five people wish to contact the reader and that the reader has accepted communication with all of them with the exception of Olle Andersson. The reader has also informed the meeting broker that he wishes to speak with Karl Persson and Per Nilsson at a later time or date but is positive to communication with Jan Olsson and Sture Karlsson. The reader himself has requested the broker to organize a meeting with three persons given in the lower half of the call list 91. Since it is the reader himself who has requested these meetings, the reader has a positive attitude towards these meetings, as is evident from the information given under the heading STATUS, where OK indicates that the meeting is desired. The reader also wishes this meeting to take place at the times listed beneath the heading TIME in the Table, where NOW indicates that the meeting shall take place at the moment of reading the list. Since the reader merely wishes to deliver a message to August Klang, he has requested an indirect meeting. Although not explicitly stated above, the person who is notified of an indirect meeting, in this case August Klang, can leave a reply message, if so desired. This reply message can be stored in the meeting broker or at other storage locations. The procedures herefor are described in more detail in copending U.S. patent application Ser. No. 08/018,212 entitled "A Paging Method".

Figure 14:
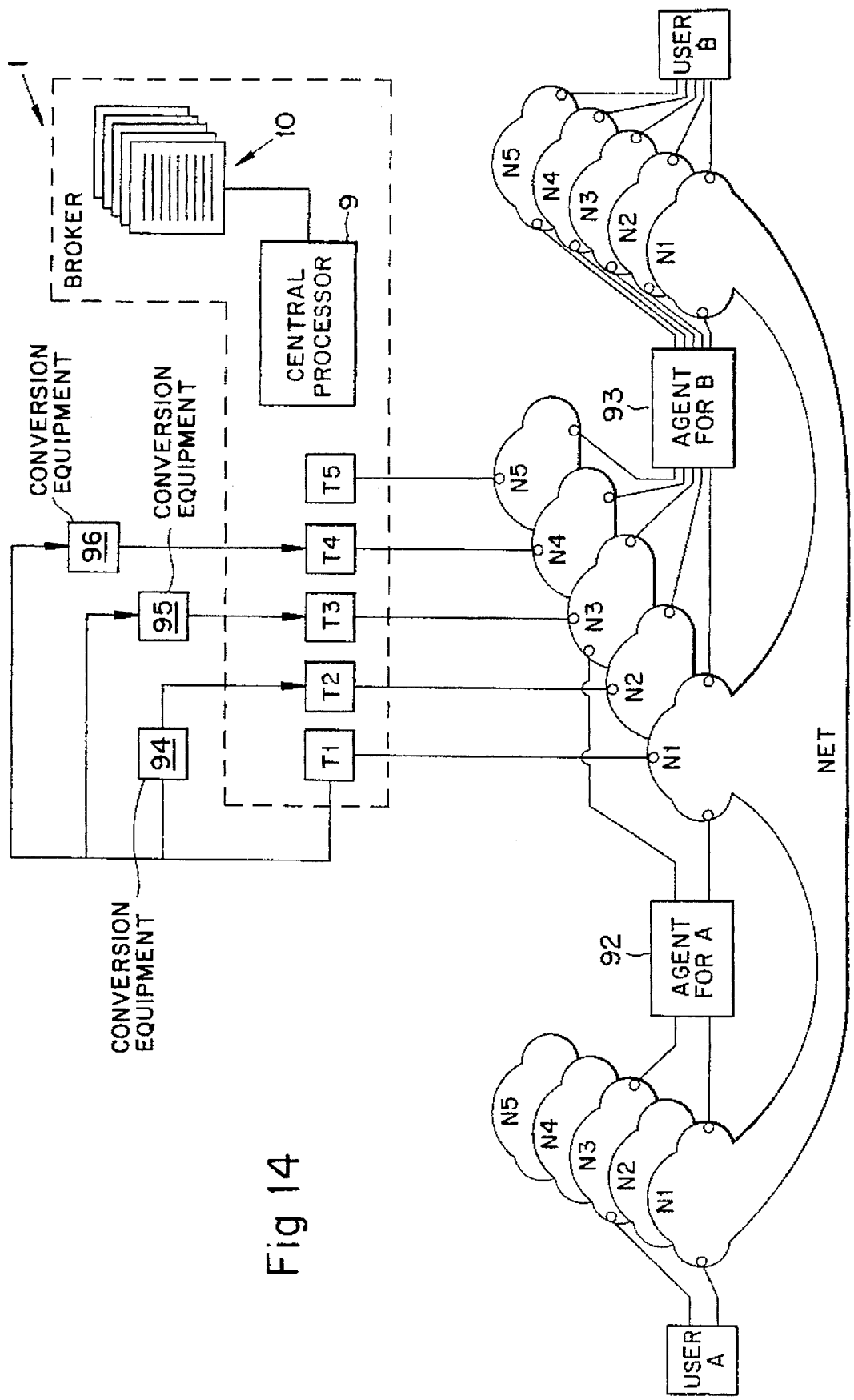
FIG. 14 is a block schematic which illustrates those terminals that are included in a communication system which utilizes the inventive communication method in the environment shown at the bottom of FIG. 1.

FIG. 14 illustrates schematically the environment that prevails when two clients are each represented by a respective agent. The user A is represented by his agent 92 and the user B by his agent 93. The agents 92 and 93 continuously make meeting requests and continuously manage the negotiations with the meeting broker in accordance with those instructions given by respective customers or clients. The telecommunication networks through which the agents communicate with their respective clients are preferably the same networks as those through which the agents communicate with the broker 1, although there is nothing to prevent the networks from being mutually different networks, i.e., there is nothing to prevent the client and his agent communicating over one network which is different to the network over which the agent communicates with the meeting broker. The conversion equipment 94, 95, 96 enable the broker to function as a gateway, and therewith allow a client on one telecommunication network to communicate with another client located on another telecommunication network. As shown in FIG. 14, the conversion equipment 94, 95, 96 enables signals from the network N1 to be converted to each of the networks N2, N3 and N4, and vice versa, i.e. signals from each of the networks N2, N3 and N4 can be converted to signals that can be used in the network N1. Similar conversion equipment can be provided for converting signals from the network N2 to signals for use with signals N3 and N4, and vice versa. Equipment can also be provided for converting signals from the network N3 to signals for use in network N4, and vice versa.

Described in copending U.S. patent application Ser. No. 08/018,214 entitled "A Method of Establishing a Connection", there is described a method which enables the terminal points of two connections to be mutually coupled in a meeting place. The method is administered by a meeting organizer. The meeting organizer may select the meeting place on the basis of different criteria, for instance prevailing traffic load in different nodes of the network in which the clients shall meet. The meeting point may also be chosen with regard to the costs of the connection. It can be said generally that the meeting point may be chosen either in the node in which one client is found or in the node in which the other client is found, or in some node therebetween.

Figure 15:
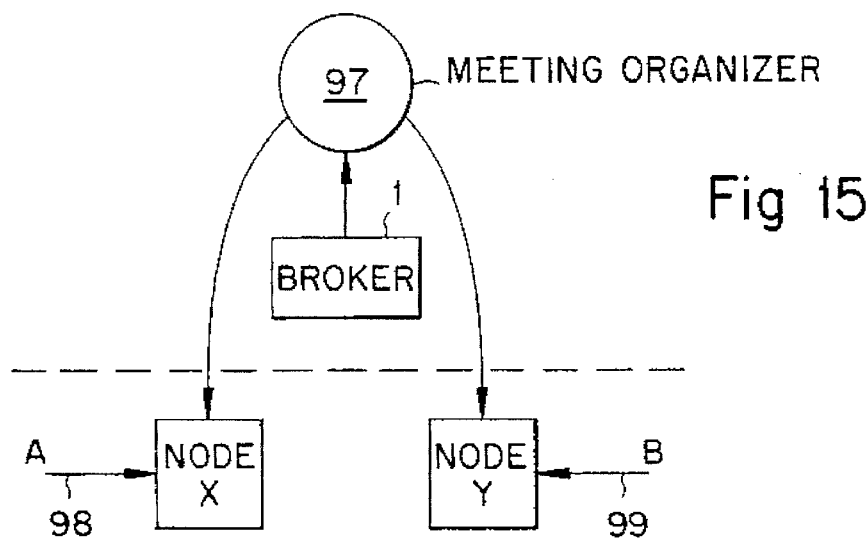
FIG. 15 is a block schematic which illustrates the interaction between two parties and a meeting organizer.

FIG. 15 illustrates a meeting organizer 97 which has received from a meeting broker 1 a connection order, or request, according to which a client A wishes to contact a client B. Both clients have expressed themselves willing to the meeting being set-up, and client A has established a connection with the node X in which client A is located. This connection is represented by the full arrow 98, while the tip of the arrow represents the terminal point of the connection. Correspondingly, client B has established a connection 99 with the node Y in which client B is located. The meeting organizer is now able to select different meeting points on the basis of what has transpired during the negotiating process.

Figure 16:
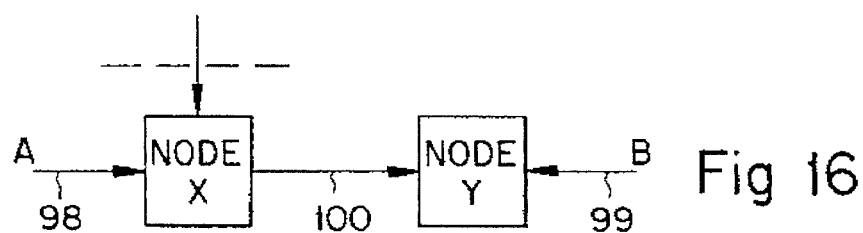
FIG. 16 is a block schematic which shows that the meeting place is situated in node Y of one party B.

In the case of the FIG. 16 illustration, the meeting organizer has elected to place the meeting point at the node Y in which client B is found. The meeting organizer has previously reserved in node Y two meeting references, so-called IA-numbers, which are described in more detail in copending U.S. patent application Ser. No. 08/018,268. An assignment process in node X now establishes a connection from X to node Y, shown by the full-line arrow 100. The assignment process in node X also connects the connection 98 with the connection 100, internally within the node X. An assignment processing node Y controls calls on the incoming ports to the node and when a connection enters the node and refers to one of the IA-numbers, the assignment process couples the connection 100 with the connection 99 internally within the node Y, thereby establishing connection between the clients.

Figure 17:
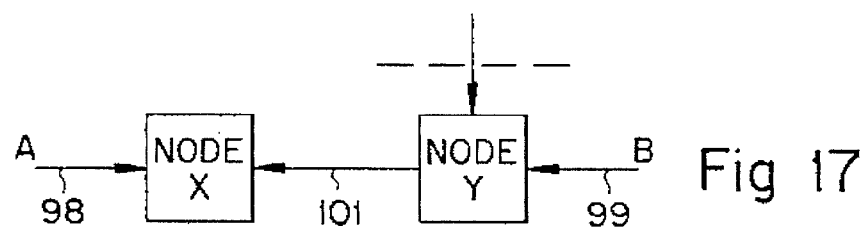
FIG. 17 is a block schematic which shows that the meeting place is situated in node X of the other party A.

FIG. 17 illustrates an alternative case in which the meeting organizer 97 has chosen to place the meeting point in node X. The meeting organizer has previously reserved two IA-numbers in node X and has transmitted one of these numbers to the node Y, over a signal connection not shown, which therewith initiates an assignment process which constitutes a call with the use of the transmitted IA-number, wherein a connection 101 is established to node X. An assignment process in node Y also connects the connection 99 to the connection 101 internally within the node Y. When a call enters node X and the call refers to the earlier transmitted IA-number, there is initiated in node X an assignment process which couples the connection 101 to the connection 98. The connection between the clients A and B is now established.

Figure 18:
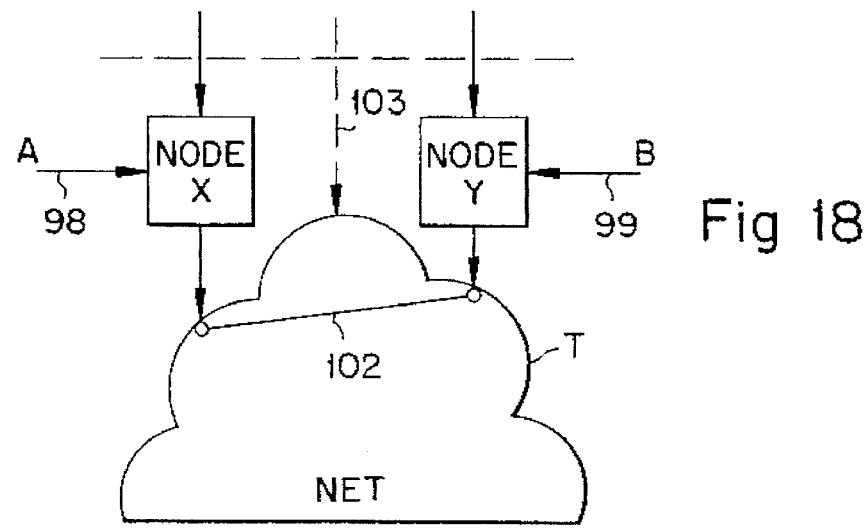
FIG. 18 is a block schematic which shows that the meeting place is situated within a network.

FIG. 18 illustrates the case in which the meeting organizer 97 has chosen to place the meeting point at some location in a telecommunication network T. The precise manner in which this is achieved is described in copending U.S. patent application Ser. No. 08/018,214. The meeting point between the clients A and B is shown symbolically by the full-line 102. A broken arrow 103 in FIG. 18 indicates signalling of the meeting organizer to other nodes (not shown) in the network T which possess similar meeting arranging functions to the meeting organizer 97.

It will be understood that although the illustrated system has been described in personal pronoun terms, these terms are not limited to the distinction of an actual person.

I claim:

1. A method of organizing communication between at least two users in the form of a meeting, of which a first user wishes to communicate with a second user via at least one telecommunication network, wherein the first user sends to an intermediary, which is called a meeting broker, a request, called a meeting request, corresponding to the first user's desire to communicate, comprising the steps of:

creating a meeting record by the meeting broker and allotting each user a respective meeting reference to relate the user to the meeting;

reporting to the meeting broker each user's respective desire in respect to the meeting inclusive of a changed attitude to the desired meeting;

detecting at the meeting broker when the desires of the users are consistent with each other; and initiating the establishment of a connection between the users when it is detected that the desires of the users are consistent with each other.

2. A method according to claim 1, wherein the first user is chosen from a group that is comprised of a first client and an agent of said first client; and in that the second user is chosen from a group comprised of a second client and an agent of said second client.

3. A method according to claim 2 in which the users have access to several different telecommunication networks, wherein each user discloses to the meeting broker
  (a) the telecommunication network through which respective users desire access to the meeting; and
  (b) the user's access point in this telecommunication network.

4. A method according to claim 3, wherein only one telecommunication network is used by the users during the meeting.

5. A method according to claim 2, wherein the meeting broker assigns a meeting identification to the requested meeting; and the meeting broker informs the users of the meeting identification.

6. A method according to claim 5, wherein one of the users selects conditions for the meeting from a group of conditions including:

(a) the time at which the meeting shall take place;

(b) the form of the meeting;

(c) the telecommunication networks through which respective users establish the connection and all possible combinations thereof; and (d) who shall pay for the meeting.

7. A method according to claim 6, wherein said form of the meeting is chosen from among a first subgroup of conditions that includes:

(1) an accepted interactive meeting, meaning that the second user has agreed that the meeting shall take place;

(2) a rejected interactive meeting, which means that the second user has said no to an interactive meeting with the first user A and that the second user does not exclude the possibility of establishing communication with the first user in some other way;

(3) an accepted indirect meeting, which means that the second user has agreed to communicate with the first user via indirect communication over a telecommunication network; and (4) a rejected indirect meeting, which means that the second user does not wish to establish communication with the first user.

8. A method according to claim 7, wherein the condition whereby an interactive meeting is accepted include one of the following:
   (a1) an immediate interactive meeting, meaning that the first user desires the meeting with the second user to take place immediately; and
   (a2) a negotiated interactive meeting, meaning that the second user desires the meeting to take place, but on a later occasion that is suitable both to him and to the first user.

9. A method according to claim 8, wherein the condition whereby an indirect meeting is accepted implies the following possibilities:
   (i) that the first user provides the meeting broker with a first reference to a first storage location in a network; that the first user stores a message in the first storage location; that the meeting broker sends the first reference to the second user; and that the second user; when using the first reference and on an occasion which suits the second user, collects the message left by the first user;
   (ii) that the second user provides the meeting broker with a second reference to a second storage location in a network; that the first user stores a message in the second storage location; and that the second user collects said message on a later occasion; and
   (iii) that the meeting broker provides the first user with a third reference to a third storage location in a network; that the first user stores a message in the third storage location; that the meeting broker provides the second user with the third reference to the third storage location; and in that the second user collects the message at the third storage location on an occasion which suits him.

10. A method according to claim 8, in which the users have negotiated an agreement with regard to the condition negotiated interactive meeting and several users, in addition to the first user, have ordered a meeting with the second user and the second user has several meeting identifications, wherein
    the second user during said negotiation proceedings and prior to notification informs the meeting broker of his attitude to receiving notification, wherein the second user has chosen his attitude,
    that the second user wishes to receive notification solely for the meeting which applies to the first user while rejecting the remainder of the users' notifications.

11. A method according claim 10 in which the users have negotiated an agreement with regard to the condition negotiated interactive meeting, wherein
    notification is preceded by:
      the first user keeping the meeting broker continuously informed as to whether or not said first user has changed his attitude to the meeting, by providing the meeting broker with a first status marking when the first user accepts that the requested meeting shall take place and a second status marking when the first user rejects the requested meeting; and
      that the meeting broker continuously monitors the first and the second status markings of the users and initiates coupling of the connection between the users when both users give the first status marking simultaneously.

12. A method according to claim 11, wherein the users are connected with their respective agents for issuing the agents with their instructions over first, selected telecommunication networks.

13. A method according to claim 8 in which the users are agreed on conditions (a1), wherein
    the connection is initiated through a call made by the second user to a meeting organizer.

14. A method according to claim 7 in which the users have negotiated an agreement with regard to the condition negotiated interactive meeting, wherein
    before initiating the meeting, the meeting broker informs the users that the meeting shall take place by sending an alert signal to respective users.

15. A method according to claim 7, wherein
    the form of the meeting is chosen from a second subgroup comprised of:
      (a) communication between two users; and
      (b) communication between several users.

16. A method according to claim 15 in which the users have negotiated an agreement with regard to the condition negotiated interactive meeting, wherein
    the first user continuously informs the meeting broker as to whether or not the first user has changed his attitude to the meeting, by providing the meeting broker with a first status marking when the first user accepts that the requested meeting shall take place, and a second status marking when the first user rejects the requested meeting;
    remaining users inform the meeting broker continually of their changed attitudes to the meeting, by providing the broker with a first status marking when respective other users accept that the requested meeting shall take place and a second status marking when respective other users reject the requested meeting; and
    the meeting broker monitors continuously all users' status markings and initiates the establishment of a connection between the users when all users declare the first status marking simultaneously.

17. A method according to claim 16, wherein
    the meeting broker switches-in conference equipment.

18. A method according to claim 17, wherein
    the connection is initiated by the meeting broker sending to an applicable intermediary, called a meeting organizer, a connection request containing:
      (a) information relating to the telecommunication networks chosen by the first user and the access point of the first user in said network;
      (b) information relating to the telecommunication networks chosen by other users and the access points of said other users in these networks;
    on the basis of the connection request, the meeting organizer issues an order concerning the establishment of said connection, this order being selected from among the following group of orders:
      (1) one of the users is commanded to call the other users and when making the call to use the access port related to the first user; and
      (2) remaining users are ordered to call their respective access points in a telecommunication network in which the aforesaid access ports are coupled together in response to a command from the meeting organizer.

19. A system for organizing communication between at least two users in the form of a meeting, of which a first user wishes to communicate with a second user via at least one telecommunication network, wherein the first user sends to an intermediary, which is called a meeting broker, a request, called a meeting request, corresponding to the first user's desire to communicate, comprising the steps of:

meeting broker means for creating a meeting record and allotting each user a respective meeting reference to relate the user to the meeting;

means for reporting to the meeting broker each user's respective desire in respect to the meeting inclusive of a changed attitude to the desired meeting;

means for detecting at the meeting broker when the desires of the users are consistent with each other; and means for initiating the establishment of a connection between the users when it is detected that the desires of the users are consistent with each other.

20. A system for organizing communication according to claim 19, wherein the meeting broker means includes a program controlled computer.

21. A system for organizing communication according to claim 20, wherein said program controlled computer can be located at the same place as either user.

22. A system for organizing communications according to claim 21, wherein said program controlled computer is connected to several different telecommunication networks, and functions as a gateway.

* * * * *